(12) United States Patent
Sullivan et al.

(10) Patent No.: US 11,354,685 B2
(45) Date of Patent: *Jun. 7, 2022

(54) PRODUCT OBSOLESCENCE FORECAST SYSTEM AND METHOD

(71) Applicant: Architecture Technology Corporation, Minneapolis, MN (US)

(72) Inventors: Drew Sullivan, Washington, DC (US); Evan Eaves, Alexandria, VA (US); William Colligan, Vienna, VA (US)

(73) Assignee: Architecture Technology Corporation, Minneapolis, MN (US)

(*) Notice: Subject to any disclaimer, the term of this patent is extended or adjusted under 35 U.S.C. 154(b) by 23 days.

This patent is subject to a terminal disclaimer.

(21) Appl. No.: 16/874,239

(22) Filed: May 14, 2020

(65) Prior Publication Data

US 2020/0279281 A1 Sep. 3, 2020

Related U.S. Application Data

(63) Continuation of application No. 15/453,006, filed on Mar. 8, 2017, now Pat. No. 10,657,548.

(51) Int. Cl.
*G06Q 30/02* (2012.01)
*G06N 3/04* (2006.01)
(Continued)

(52) U.S. Cl.
CPC ....... *G06Q 30/0202* (2013.01); *G06N 3/0472* (2013.01); *G06N 3/084* (2013.01); *G06N 7/005* (2013.01)

(58) Field of Classification Search
CPC .. G06Q 30/0202; G06N 3/0472; G06N 3/084; G06N 7/005
(Continued)

(56) References Cited

U.S. PATENT DOCUMENTS 6,226,561 B1 * 5/2001 Tamaki ................. G06Q 10/06
700/115
6,480,840 B2 * 11/2002 Zhu ........................ G06Q 10/02
(Continued)

FOREIGN PATENT DOCUMENTS

WO WO-0193086 A2 * 12/2001 ............. G06Q 10/06

OTHER PUBLICATIONS

Tim et al (Planned Obsolescence and Product-Service Systems: Linking Two Contradictory Business Models), Feb. 2016, JCSM, vol. 8, pp. 29-52 (Year: 2016).*

*Primary Examiner* — Romain Jeanty
(74) *Attorney, Agent, or Firm* — Key IP Law Group, PLLC

(57) ABSTRACT

A product obsolescence forecast system includes machine instructions stored in a non-transitory computer readable storage medium, the machine instructions. A processor executes the instructions to receive an identity of a first product and identities of one or more second products similar to the first product, each of the second products having gone obsolete; receive a determinant of obsolescence of one or more of the obsolete second products; generate one or more observations related to the first product by inputting each received determinant to a trained network; and generate a statistical analysis of the one or more observations to provide an expected value of an actual obsolescence date for the first product.

19 Claims, 31 Drawing Sheets

(51) Int. Cl.
*G06N 3/08* (2006.01)
*G06N 7/00* (2006.01)

(58) Field of Classification Search
USPC .......................................................... 705/7.31
See application file for complete search history.

(56) References Cited

U.S. PATENT DOCUMENTS

| | | | | |
|---|---|---|---|---|
| 8,452,785 | B1 * | 5/2013 | Iida | G06Q 30/0601 |
| | | | | 707/754 |
| 8,489,532 | B2 * | 7/2013 | Hunt | G06Q 30/0629 |
| | | | | 706/45 |
| 8,781,916 | B1 * | 7/2014 | Buryak | G06Q 30/0631 |
| | | | | 705/26.7 |
| 2005/0187744 | A1 * | 8/2005 | Morrison | G06Q 10/06 |
| | | | | 703/2 |
| 2014/0012660 | A1 * | 1/2014 | Li | G06Q 30/0241 |
| | | | | 705/14.42 |
| 2014/0279246 | A1 * | 9/2014 | Chen | G06F 16/58 |
| | | | | 705/26.61 |
| 2014/0279263 | A1 * | 9/2014 | Liu | G06Q 30/0627 |
| | | | | 705/26.63 |
| 2015/0193863 | A1 * | 7/2015 | Cao | G06Q 30/0643 |
| | | | | 705/27.2 |
| 2016/0171590 | A1 * | 6/2016 | Kolb | G06Q 30/0631 |
| | | | | 705/26.7 |
| 2017/0178206 | A1 * | 6/2017 | Lee | G06F 40/216 |

\* cited by examiner

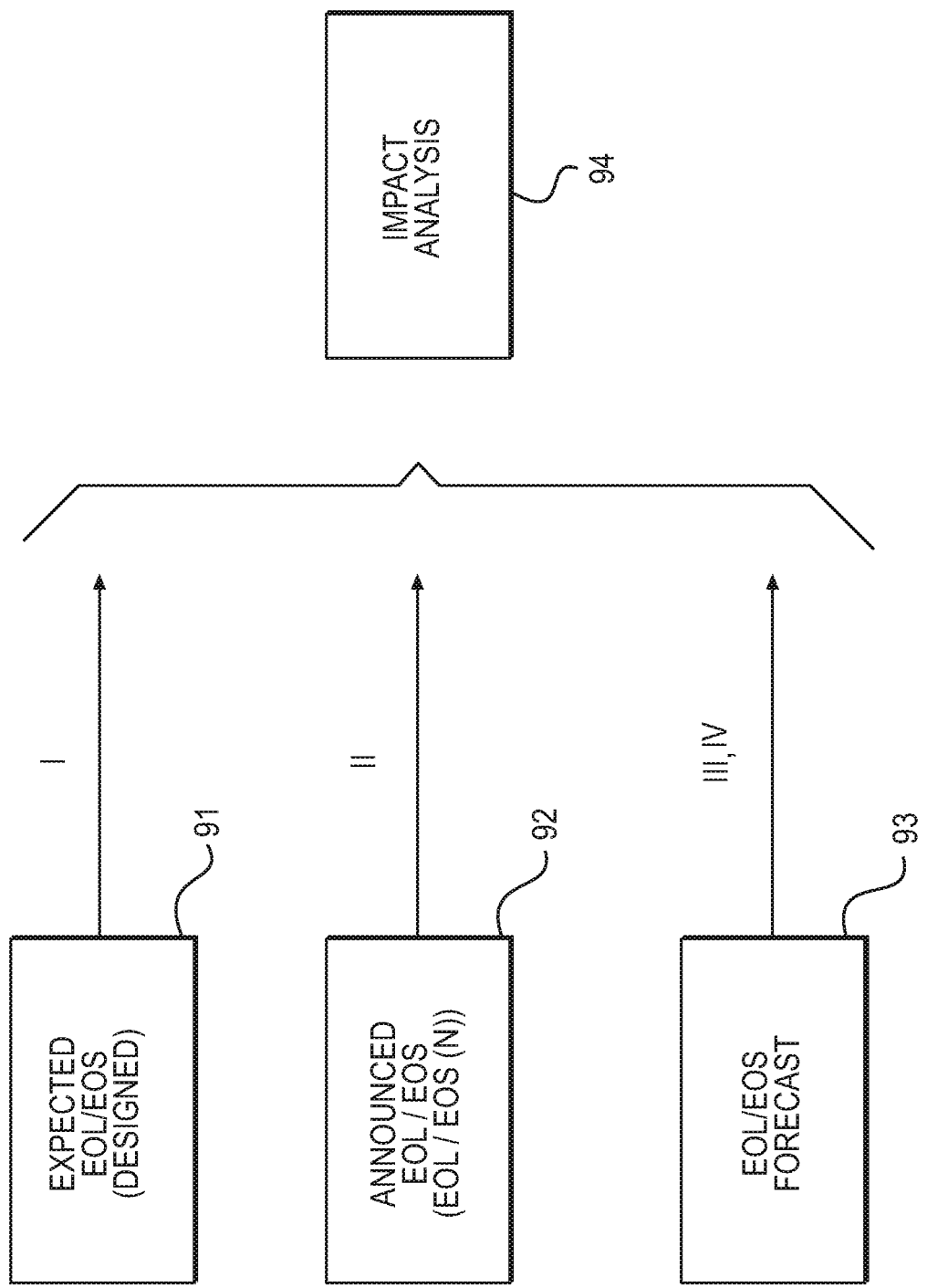

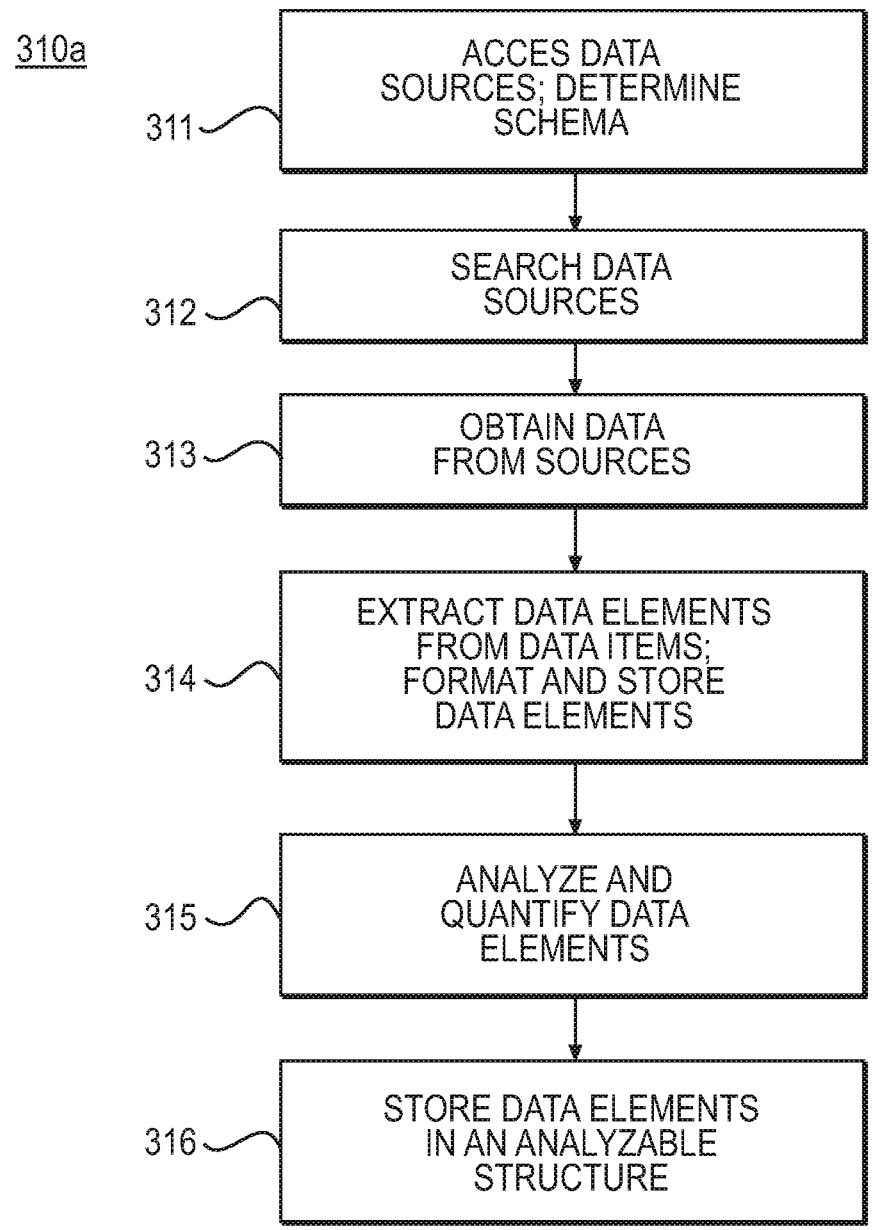
FIG. 3B(1)

310b
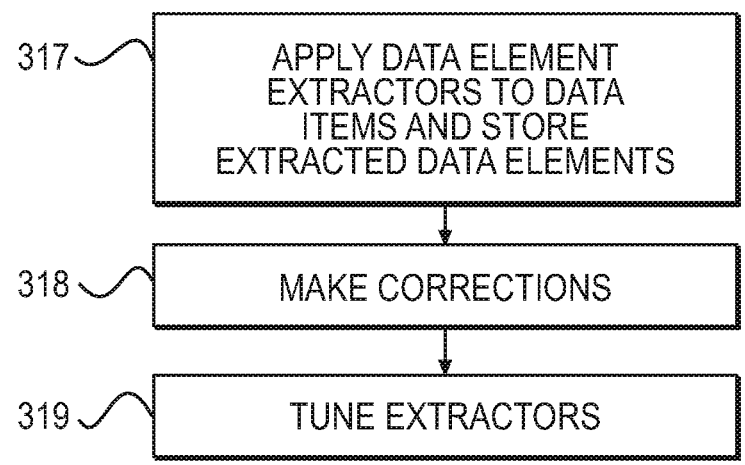
*FIG. 3B(2)*

PRODUCT OBSOLESCENCE FORECAST SYSTEM AND METHOD

RELATED APPLICATIONS

This application is a continuation of U.S. patent application Ser. No. 15/453,006, filed Mar. 8, 2017, entitled Product Obsolescence Forecast System and Method.

BACKGROUND

Asset obsolescence, whether the asset is tangible or intangible, may refer to a process or condition by which the asset becomes no longer useful or a form and function of the asset no longer is current or available for production or repair. For example, implementation of new technology may lead to an asset becoming less supportable due to diminished availability of parts and suppliers. Thus, obsolescence may be defined as a condition of being out of date—a loss of value occasioned by new developments that place an older asset at a competitive disadvantage and/or a decrease in the value of an older asset brought about by the development of new and more economical methods, processes and machinery.

Obsolescence of an asset may be distinguished from end of life of the asset in that end of life may simply refer to the expected or actual failure of the asset. For example, a common light bulb typically is sold with an expected number of hours of illumination before failure, but the light bulb is not obsolete just because it burns out. However, in an aspect, the same light bulb may become obsolete because of government action or regulation—for example, the Federal Government's Energy Independence and Security Act of 2007, which included provisions to phase out certain incandescent light bulbs in favor of more energy-efficient options such as fluorescent light bulbs, or the Digital Transition and Public Safety Act of 2005, which phased out non-digital television broadcasting. In another aspect, a defined end of life of an asset may refer to a designation made by the asset's manufacturer. As an example, a product manufacturer may introduce a programmed switch with a defined or stated end of life—e.g., two years—at which point the programmed switch is deemed obsolete. In yet another example, a manufacturer of programmed switches may announce the current programmed switch no longer will be supported—i.e., the programmed switch will become obsolete. In some situations involving this last example, end users of the programmed switch may be unpleasantly surprised by the "designated obsolescence" of the programmed switch.

The above examples suggest that obsolescence management may focus on actions to be taken in response to a manufacturer's announced, future discontinuance of an asset, or to an announced government regulation.

SUMMARY

A product obsolescence forecast system comprises machine instructions stored in a non-transitory computer readable storage medium. A processor executes the machine instructions to access data items related to a first product and one or more second products designated as similar to the first product, the first product and each of the one or more second products belonging to a same class of products; extract data elements from the data items; reformat the data elements as analyzable data elements and store the analyzable data elements in an analyzable data structure; apply a probabilistic model to selected ones of the analyzable data elements to provide a forecast obsolescence date for the first product; and using the forecast obsolescence date, determine one or more impacts based on the forecast obsolescence date. The probabilistic model may be a Bayesian neural network and a data element comprises an actual obsolescence date for each of the one or more second products. To identify specific second products, the processor constructs a data element similarity matrix for each of a plurality of the second products; compares the data element similarity matrix for each of the plurality of second products to a data element matrix for the first product; and based on the comparison, designates selected ones of the second products as similar to the first product. Furthermore, the processor executes a search of one or more data sources to identify the data items, the data sources including one or more of structured, semi-structured, and unstructured data items. The processor determines the one or more impacts by determining an availability of additional copies of the first product and a cost to acquire the additional copies for sustainment; determining availability of new products to replace the first product and a cost to acquire the new products; and determining a scheduling availability of systems comprising the first product for replacement of the first product.

A product obsolescence forecast system comprises machine instructions stored in a non-transitory computer readable storage medium. When a processor executes the machine instructions, the processor forecasts that a first product will have an end of life (EOL) within a set time frame using a probability/statistical model; identifies systems comprising the first product and determining impacts of the forecast EOL on the identified systems, and determines the impacts including defining a replacement product for the first product, determining viability and cost of a bulk buy option of the first product, determining a cost for replacing the first product with the replacement product, and determining a schedule for each of one or more of the systems for replacing the first product. The processor also executes the machine instructions to determine a compatibility of the replacement product in the one or more systems; and determine the cost of replacing including determining the cost of replacing based on the determined schedule. The processor further executes the machine instructions to access and search a plurality of data sources, comprising determining a schema of one or more of the plurality of data sources, the plurality of data sources including structured, semi-structured, and unstructured data sources, to identify and retrieve one or more data items relevant to the determination of the EOL forecast; store the retrieved data items; and extract and store one or more data elements from the one or more data elements.

A product obsolescence forecast method includes a processor obtaining information related to a first product; the processor obtaining information related to one or more second products, the first product and the one or more second products belonging to a same product class; extracting data elements from the information related to the first product and information related to the second products; forming the extracted data elements in a structure to allow analyzing; performing a probabilistic assessment to forecast an end of life (EOL) date for the first product based on the data elements in the structure; and performing secondary analyses based on the forecast EOL date and data elements related to the first product. The product obsolescence forecast method further includes performing the secondary analyses, which includes identifying systems comprising the first product; and determining impacts of the forecast EOL date on the identified systems. Determining the impacts includes defining a replacement product for the first product, determining viability and cost of a bulk buy option of the first product, determining a cost for replacing the first product with the replacement product, and determining a schedule for each of one or more of the systems for replacing the first product. The product obsolescence forecast method still further includes determining a compatibility of the replacement product in the one or more systems; and determining the cost of replacing including determining the cost of replacing based on the determined schedule. Yet further, the product obsolescence forecast method includes a search operation, including using a Web crawler, that includes accessing and searching a plurality of data sources, and determining a schema of one or more of the plurality of data sources, the plurality of data sources including structured, semi-structured, and unstructured data sources, to identify and retrieve one or more data items relevant to the determination of the EOL forecast; storing the retrieved data items; and extracting and storing one or more data elements from the one or more data items. The product obsolescence forecast method also includes forecasting that a first product will have an end of life (EOL) within a set time frame by using a probability/statistical model and correcting and formatting the data elements; saving the corrected and formatted data elements; generating correlation mechanisms that correlate the corrected and formatted data elements; and generating similarity mechanisms that provide similarity information between the first product and one or more second products, wherein the first product and the one or more second products are from a same class of products.

DESCRIPTION OF THE DRAWINGS

The Detailed Description refers to the following Figures in which like numerals refer to like items, and in which:

FIGS. 1C-1H illustrate aspects of the structure and execution of product management and product obsolescence forecast systems in operation in the environment of FIG. 1A;

FIGS. 3A-3H are flowcharts illustrating example methods for forecasting product obsolescence in the systems of FIG. 1H and FIGS. 2A-2M.

DETAILED DESCRIPTION

Figure 1A:
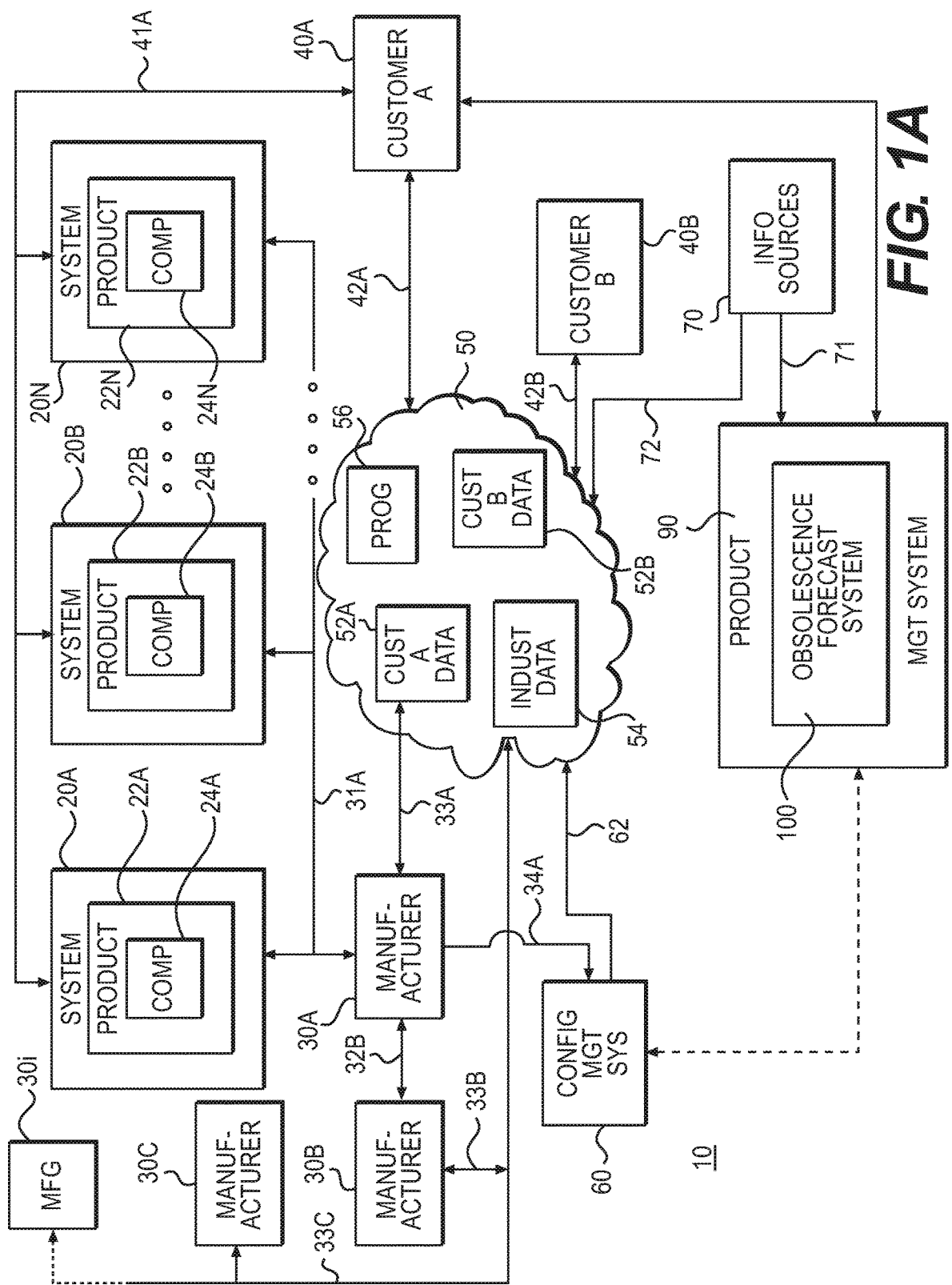
FIG. 1A illustrates a product distribution environment in which products are produced, used, become obsolete, and are replaced or discontinued, and in which a product management system and a corresponding product obsolescence forecast system operate.

Forecasting obsolescence of an asset with an acceptable confidence level may not be possible with current asset management systems. One impediment may be the large volume and variety of rapidly changing asset-related information that must be received, processed, and interpreted to make such a forecast. Another impediment may be that the asset-related information includes structured, semi-structured, and unstructured data. Yet another impediment may be an inability to adequately correlate features of an asset that may "go obsolete" with information distilled from the asset-related information. Together, these and other impediments inherent in the intake, formatting, and analysis of "big data" make impossible accurate forecasting of asset obsolescence with current systems and using current methods. Furthermore, the complex nature of certain assets and the larger systems and networks into which the assets are incorporated, along with the corresponding complex nature of related supply chains, mean that current systems and methods cannot provide satisfactory plans for asset replacement once an obsolescence date exists.

An asset (e.g., a system, product, component, assembly, sub-assembly, module, unit, device, or part) may become obsolete, and such obsolescence may refer to a process or condition by which the asset becomes no longer useful, or a form and function no longer is current or available for production or repair. For ease and clarity of description, the disclosure will henceforth refer to an asset as one of a hierarchy of devices (tangible and/or intangible) starting with a system composed of products composed of components, and so on. Also for ease and clarity of description, the disclosure will henceforth use the term obsolescence to include the terms end of life and end of service (EOL/EOS—referred to hereafter as EOL) of a system, product, or component. Discontinuance by product manufacturers, resulting in obsolescence, is driven by several factors such as, for example, when a product manufacturer realizes that a given product or technology no longer is profitable, or is less profitable than others that could be produced using the same factory floor space and work force or manufacturing process. Alternatively, manufacturers may discontinue a product because of market changes, legislation, corporate policy changes, product line rationalization after mergers and acquisitions, and other external influences. As a specific example, automated manufacturing processes often need products to be supplied in packaging that is compatible with pick and place machines (which greatly improve productivity and reliability by avoiding manual handling). If the product manufacturer discontinues or changes the packaging, the product effectively may be made obsolete, even though it is still available.

An example of an industry that faces complex obsolescence issues is the U.S. aviation industry and subsidiary avionics industries. Here, major sources of obsolescence include (1) supply side, bottom-up supply chain sources, and (2) demand side, top-down airspace management and regulation sources. Obsolescence may arise because of product deletions in the supply chain of components, sub-assemblies, tools, or platforms; legislation or standards; and airworthiness rule changes. A factor in supply chain obsolescence is that the aviation industry is not vertically integrated and depends on an extensive commercial off-the-shelf (COTS) supply base, which leads to a technology life cycle mismatch between the supply base and avionics manufacturing. The components supply chain is on a commercially focused technology cycle of a few years (2-7 years) whereas the life cycle of aircraft and avionics is many times longer, typically 20 years or more; in fact, some widely-used commercial airliners (e.g., the Boeing 737) have been in service for over 50 years and some military aircraft (e.g., the B-52 bomber) for almost 70 years. One factor in legislation induced obsolescence is increasing societal demands for a less polluted environment. Regulatory induced obsolescence occurs along with the evolution of airspace management and changes needed in associated air and ground systems in response to increasing public demand for more capacity, fewer delays, and improved security and safety.

Product deletion decisions may include designation of a last time to buy (LTB) date, which generally means that a product's customer or other end user will not be able to purchase supplies of the product. LTB obsolescence then occurs when the avionics manufacturer's stock, or a distributor's stock, of the product has been exhausted. In this event, new copies of the product will not be manufactured and existing fielded copies of the product may not be repairable. Since a single product may be used in many systems, this event may adversely affect many different systems simultaneously.

In addition to aviation, many other civilian and military products and systems employ commercial off-the-shelf (COTS) components, including COTS hardware and COTS software. The COTS components may be designed with an expected end-of-life (EOL). The COTS components' EOL may not match that of the larger product or system into which the COTS components are integrated. Thus, the COTS components may require replacement before the larger product is taken out of commission (purposely, by obsolescence or product EOL, for example; or unexpectedly by product failure, accident, or other reasons). Planning for COTS replacement can be a complex undertaking even when the larger products or systems are readily available. However, some products or systems may be unavailable for extended periods, and the start and stop times of a future specific unavailability period may be unknown or unknowable. Thus, obsolescence of a COTS component may conflict with product or system schedules such that replacement of the COTS component may not be possible before the COTS component's EOL.

Avionics suppliers generally notify customers and end users that a product has reached EOL by means of Service Information Letters (SIL) or Service Bulletins (SB). The semiconductor industry has an established process by which manufacturers issue product change notices (PCNs) to communicate everything from minor manufacturing changes to component end-of-life (EOL). (This practice may lead to an expectation that all manufacturers should and will issue such notices to indicate EOL when such is not the case.) PCNs may be distributed in text format by various means including electronic and hard-copy. Avionics customers may manually review and process each PCN to determine if it is relevant to an EOL decision; if the PCN is relevant, the avionics customer then may be able to mitigate the effects of the stated obsolescence.

Some manufacturers provide obsolescence notices 6-12 months or longer in advance of the stated EOL date. Such obsolescence notices may include the last time to buy (LTB) date. However, the LTB date may be announced with little time between notice and actual LTB—perhaps as the result of natural disasters or the demise (e.g., bankruptcy or merger) of a key supplier of materials or technology—and lesser notice periods are not uncommon. Sometimes a LTB notice is sent far enough in advance to cover needs until a redesign is complete and the new component is available in the supply chain.

Besides commercial or government customers, including manufacturers and end users, everyday consumers may experience obsolescence situations; an example involves the churn associated with smart phones, which seem to become obsolete on an annual basis. Sometimes smart phone "upgrades" are introduced due to advances in cellphone radio technology, new software interfaces, increased bandwidth, higher resolutions, and other factors besides the smart phone. However, once the market for the latest smart phones is saturated, manufacturers may find that the best way to generate new sales is by adding new and enticing features, thereby making the older smart phone versions as less appealing, if not immediately or shortly obsolete. Everyday consumers also may be unpleasantly surprised to find incandescent light bulbs are hard to find for some applications.

In the cases of light bulbs and smart phones, end-of-life, obsolescence, or scarcity may be an annoyance, particularly when light bulb or smart phone scarcity, obsolescence, or end-of-life arrives with little or no warning. However, scarcity, obsolescence, or end-of-life of such devices seldom poses severe economic repercussions or worse—seldom affects safety or security. Other systems, products or components may reach obsolescence, or may include components that reach obsolescence, with little or no notice, and with severe financial, safety, or security concerns.

For more critical systems, customers may consider aftermarket products that are authorized by the original equipment manufacturer (OEM) to continue product production after an announced or planned obsolescence. Another option is to obtain a redesigned product, but this option may be too time-consuming. Yet another option is to wait until a manufacturer or supplier announces the end of a product's manufacturing cycle and then place a final order, hoarding the extra products the customer expects it will need to support product replacement throughout its systems' lifetimes. But such bulk buy purchases may involve many unknowns. First, not all manufacturers send obsolescence notices far enough in advance to allow their customers time to request a final buy. The Government-Industry Data Exchange Program (GIDEP) estimates that it receives about 50 to 75 percent of the obsolescence notices that are relevant to the Department of Defense (DoD); but this does not mean that the notices reach DoD program managers before the product has been discontinued. Second, customers may not be able to accurately determine how many copies of the product to stockpile. For inexpensive products, lifetime buys may exceed predicted demand, because a manufacturer may set a minimum purchase amount. Third, products can be lost or degrade with age. Thus, "reactive" obsolescence management—waiting in line for a day to buy the latest version of a smart phone or waiting to receive a PCN announcing EOL for a chipset or microprocessor and then making a bulk buy—may not be adequate strategies, especially when managing critical systems.

To address shortcomings with reactive obsolescence systems and methods, disclosed herein are predictive obsolescence methods, which may include, for example, identifying and ranking critical components according to their forecast risk of obsolescence prior to obsolescence occurrence or obsolescence notification, quantitative methods for the selection of obsolescence resolution options, and imposing quantitative obsolescence risk assessment rules and restrictions within the product design processes. Considering the smart phone obsolescence example, smart phone consumers may be able to guess when their phones may become obsolete. However, no process exists for consumers to accurately forecast smart phone obsolescence.

The smart phone example described above is simplistic in many respects. First, the introduction of new smart phone models has become a routine occurrence. Second, the entire smart phone may be considered "obsolete" when in fact only one or more components of the smart phone may be upgraded. For example, a smart phone may be considered a "system." The smart phone system may be composed of "products," which in turn may be composed of "components." What drives the obsolescence of a smart phone may be unknown or unknowable to a smart phone user. Third, non-technical factors may affect the introduction of a new smart phone—refer to the two examples of Federal legislation described above. Fourth, such predictions may be wildly inaccurate. These and other factors make it is difficult to detect or predict product obsolescence in real time or near real time, and with any accuracy based on limited and uncertain information or fragmentary analyses from such information. Thus, even when product obsolescence occurs, its effects might not be quickly prevented from spreading. To accurately predict product obsolescence in sufficient time to address its effects may require that obsolescence analyses be made based on a wide variety of information including, for example, published obsolescence notices for the same or similar products, product monitoring information (e.g., miles measured by an odometer, hours of CPU time measured by a software program), historical obsolescence patterns from the same or similar products, environmental or in-service effects on a product, real time information from social networks, and other types of information.

The above information sources may include structured data, semi-structured data, and unstructured data. Structured data may refer to data found in a traditional database, such as a relational database. Semi-structured data may refer to data arranged in a preset format, such as header information associated with a data packet or metadata. Unstructured data may refer to data in a flat file, such as text from an email, a blog, or a digitized document. Certain of the information sources also may be classified as or may include "big data" sources. As used herein, "big data" refers to large volume data as well as data not easily processed or managed by traditional data management technologies such as a SQL database manager. Factors that may contribute to the difficulty in handling "big data" typically are described as data volume, variety, velocity, and veracity. These and other factors may make such "big data" unsuitable for storage in traditional database structures and unsuitable for analysis by traditional data analytics programs.

Current product management systems are not able to process big data sources, including structured, semi-structured, and unstructured big data sources, to accurately forecast product obsolescence and to suggest actions to compensate for such obsolescence forecasts. To further address problems with existing systems, the herein disclosed systems, and corresponding methods, forecast product obsolescence in real time based on multiple information sources including big data information sources. The information sources may include direct product monitoring information, where appropriate, product obsolescence patterns derived from product history data for the same or similar products, and/or from the same or other manufacturers, product environment and in-service data, including systems in which the product may be incorporated, and information available in social networks, to accurately forecast product obsolescence and account for such product obsolescence. In an embodiment, the herein disclosed systems and methods provide a solution to the obsolescence forecasting problem by collecting structured, semi-structured, and unstructured data related to a product, and similar data, formatting the collected data, storing the formatted data in an analyzable data structure, analyzing the stored, formatted data, and generating and training a product obsolescence prediction network using the analyzed data. The systems and methods then apply the product obsolescence prediction network to big data sources associated with similar products or the same product; i.e., the product and the similar products belong to a same product class. The systems and methods update and refine the product obsolescence prediction network, as appropriate, when additional data are collected. To illustrate structures of the herein disclosed systems, and operation of the corresponding methods, reference may be made to a hypothetical scenario in which a chipset (i.e., a microprocessor, whether single core, multi-core, or other architecture) used in certain processors (i.e., computers) may go obsolete. In this hypothetical scenario, the chipset or microprocessor will be referred to as a product and the processor (computer) as a system. The processor itself may be part of a larger system such as an aircraft avionics system, which in turn may be part of an even larger system such as an airplane. For simplicity of description, in this hypothetical scenario, when the product (i.e., the microprocessor) "goes obsolete," replacement copies of the product no longer are available from the product manufacturer directly or indirectly through an established distribution chain; however, second hand supply sources (e.g., used equipment sources) may maintain copies of the product, and such copies may include unused and used copies of the product.

In an embodiment, the product management and product obsolescence forecast systems may include a product obsolescence feature collecting unit that collects data and information related to obsolescence features of a product; a processing unit that processes the collected data and information related to the product obsolescence features and generates analyzable product obsolescence information; a product obsolescence forecast system that uses the analyzable product obsolescence information to forecast product obsolescence and analyze impacts of the obsolescence; and a data storage system.

In an aspect, the product obsolescence forecast system or the product management system may include a similarity unit to determine similarity between and among a product, data items, and data elements related to a product that may go obsolete and similar or related products that have gone or will go obsolete. The systems also may include a correlation unit, which includes a cascade of correlators. Each correlator may execute a correlation process (e.g., a least squares fit or linear regression process). Each correlator also may produce a correlation matrix that is a measure of the correlation of features of the product that may go obsolete and corresponding features of the similar or related products. In an aspect, the correlation unit may correlate certain features, based on the correlation matrices, with features having a high correlation coefficient being more meaningful in terms of forecasting obsolescence. In another aspect, the product obsolescence forecast system may include a conditional probability module that predicts the probability a product will "go obsolete" at a specific and unannounced EOL date.

In an aspect, the product obsolescence forecast system may receive institution-sourced big data, system-sourced (e.g., log) big data, and social media-sourced big data and may store the data in a data storage system. In an aspect, the data storage system may incorporate a distributed file system. The product obsolescence feature collecting unit may collect the institution-sourced big data using a command-line interface application to transfer data between an institution's relational databases (or other database structures) and the data storage system. The feature collecting unit may collect the log big data using a streaming data channel or similar device. Finally, the feature collecting unit may collect the social media-sourced big data using a Web crawler. Note that the Web crawler may be applied o most or all networks, including the Internet-based sources. In an embodiment, the institution big data may include institution-generated data such as a Product Change Notice (PCN), the system big data may include data generated from product monitoring equipment, and the social big data may include text and image data generated through social media. In an embodiment, the data storage system may be structured as a distributed file system or cluster; the cluster or dispersed cluster may include multiple devices that store the product obsolescence information. In an aspect, the data storage system may use cloud storage mechanisms.

In an embodiment, a product obsolescence forecast method includes collecting data and information related to product obsolescence features of a product; processing the collected data and information related to the product obsolescence features, generating, from the processed data and information, product obsolescence information of an analyzable format; and analyzing the information to forecast product obsolescence.

In addition to obsolescence forecasting, the herein disclosed systems and methods assess the impact of obsolescence on systems, products, and components. The systems and methods assess such impacts in both downstream and upstream directions. Consider, for example, a processor that employs a specific heat dissipation component and that is used in an avionics system. The processor is upgraded with an improved microprocessor that produces much less heat, making the processor, and hence the avionics system, more reliable in response to pending FAA guidelines for improved reliability of the avionics system. Perhaps the improved avionics system reliability could have been achieved by other means; however, the processor manufacturer elected to upgrade the microprocessor. This decision could make the current heat dissipation component and the avionics system obsolete. Accordingly, the disclosed systems and methods account for possible upstream (product to system) and downstream (product to component) obsolescence.

The product obsolescence forecasting systems and methods may be used to assess, in real time, the impact of obsolescence on product replacement before or after the forecast obsolescence date (e.g., the LTB date) including bulk buy of existing products, scheduling product replacement, purchasing alternate products, and purchasing new, replacement products in response to a published obsolescence date and/or a forecast obsolescence date.

As noted above, to accurately forecast product obsolescence, various types of real time and historical information on product obsolescence are collected. Information collection is made from the entire sections of product design, production, and distribution including production sites, storages, processing companies, logistics centers, wholesale and retail stores and outlets, and consumers (end users) and the in-service product information from products used or controlled by the end users.

FIG. 1A illustrates an environment in which a product management system and a corresponding obsolescence forecast system may be implemented to forecast when a product may become obsolete, define the consequences of such obsolescence, and suggest options for mitigating such obsolescence. In FIG. 1A, environment 10 includes multiple systems 20i, shown for convenience as systems 20A-20N, product manufacturers 30A, 30B, 30C, . . . 30i, end users such as customers 40A and 40B, configuration management system 60, and information sources 70. The systems 20i, manufacturers 30A-30i, customers 40A and 40B, configuration management system 60, and information sources 70 may communicate with and through cluster 50. In addition, the environment 10 may include product management system 90 and corresponding product obsolescence forecast system 100, both of which also communicate with and through the cluster 50.

Each system 20i includes product 22i, and each product 22i includes component 24i. In an embodiment, at least portions of the products 22i are manufactured by manufacturer 30A and the manufacturer 30A assembles the components 24i and the portions of the products 22i to produce the products 22i that then are integrated into the systems 20i. The manufacturer 30A may communicate with the systems 20i as shown by communications mechanism 31A. The manufacturer 30A may communicate with cluster 50 using communications mechanism 33A and configuration management 60 using communications mechanism 34A. The manufacturer 30B may communicate with the manufacturer 30A using communications mechanism 32B and cluster 50 using communications mechanism 33B. Manufacturers 30C . . . 30i use similar communications mechanisms, including communications mechanism 33C. The systems 20i may be owned and/or operated by customer 40A. Customer 40A may communicate with the systems 20i using communications mechanism 41A and cluster 50 using communications mechanism 42A. As an example, the systems 20i may be a commercial or military aircraft navigation system, including its navigation computers, and the products 22i may be microprocessors. The manufacturer 30A may manufacture the aircraft and an avionics division (not shown) of the manufacturer 30A may manufacture the navigation systems including the navigation computers using microprocessors (which may be COTS microprocessors) produced by a chip manufacturer 30B. Manufacturers 30C . . . 30i also may make semiconductors similar to those made by manufacturer 30B. The same product 22i (i.e., the COTS microprocessors) may be used by customer 40B in another avionics-related system, or in a system (e.g., a server) outside the avionics industry. Customer 40B may communicate with cluster 50 using communications mechanism 42B. Specific aspects of microprocessor obsolescence are described later with respect to FIG. 1F.

Configuration management system 60 may be operated by or for the benefit of customer 40A to manage the life cycle of systems, products, and components, including COTS components, products, and systems operated by the customer 40A and/or produced by manufacturers 30A . . . 30i. The system 60 may be implemented in whole or in part as an aspect of the product management system 90. Alternately, manufacturer 30A may operate aspects of the system 60. The system 60 may communicate with cluster 50 using communications mechanism 62. The system 60 is described in more detail with respect to FIG. 1B.

Information source 70 includes various industry (e.g., aviation, avionics), government (e.g., FAA, DoD), and private (e.g., individuals and corporations) sources who have an interest in the systems, products, and components shown in FIG. 1A. Information source 70 may produce bulletins, notices, blogs, and other data and information of interest to and for use by the manufacturers 30A . . . 30i and the customers 40A and 40B. Information source 70 may include industry-wide non-government organizations such as trade associations, lobbying organization, law firms, and other entities. Information source 70 may include standards-setting organizations. The information source 70 may provide information to product management system 90 through communication mechanism 71 and to cluster 50 using communication mechanism 72. In an aspect, the information source 70 may push some information to the product management system 90; other information may be retrieved from the information source using, for example, a Web crawler.

Cluster 50 may be a cloud-based data and programming repository. The cluster 50 is illustrated as including customer data repository 52A for customer 40A and customer data repository 52B for customer 40B. Cluster 50 also is shown to include industry data repository 54, which may receive inputs from any of the entities shown in FIG. 1A and which may provide data access to any of the entities shown in FIG. 1A. Finally, the cluster 50 may include programming repository 56. The data storage and programming elements shown in FIG. 1A are described in more detail with respect to FIG. 1C.

The environment 10 also includes product management system 90 and product obsolescence forecast system 100. The system 90, in cooperation with the product obsolescence forecast system 100 (and optionally, the configuration management system 60), enables obsolescence forecasting for the systems, products and components illustrated in FIG. 1A. Such obsolescence forecasting includes prediction of a manufacturer-noticed EOL, and given a EOL notice, prediction that actual obsolescence will or will not coincide with the noticed EOL. The product obsolescence forecast system 100 further enables analysis of the impacts of a noticed or forecast EOL, options for addressing such EOL, evaluation of product replacement compatibility, and system availability for product replacement (i.e., system scheduling). Still further, the system 100 provides various alerts, product acquisition data, and obsolescence information. These and other functions and capabilities of the systems 90 and 100 are described in detail with respect to FIGS. 2A-3M.

Figure 1B:
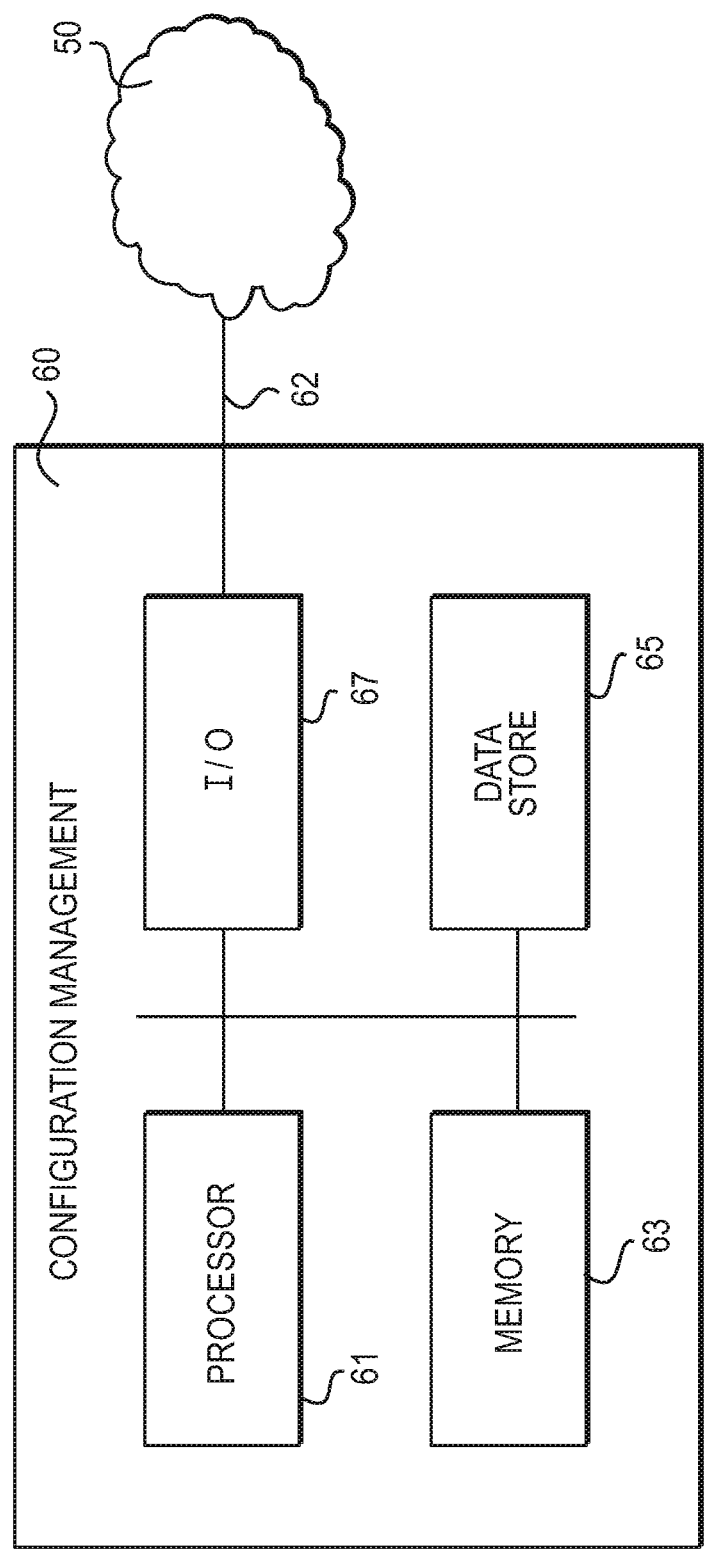
FIG. 1B illustrates a configuration management system that may be incorporated into or in cooperation with the product management system of FIG. 1A.

FIG. 1B shows aspects of the configuration management system 60. In an example, the system 60 may be used by customer 40A to manage aspects of the life cycle of a fleet of airliners and their supporting ground-based equipment. Each airplane in the fleet corresponds to a system 20*i* in FIG. 1A, and the totality of airplanes and ground-based equipment comprise a life cycle network that may be supported by and/or include the system 60. Together, the airplanes and ground equipment may include systems, products, and components. Some of the products and components may be COTS products or components. In FIG. 1B, system 60 includes processor 61, memory 63, data store 65, and input/output 67. The data store 65 receives and stores data, under control of processor 61, through input/output 67, related to connected systems, products, and components. In the commercial aviation example, COTS obsolescence management may be complex. The system 60 may be designed to facilitate life cycle management of COTS products and other products considering, for example, interactions between changing airline schedules, maintenance requirements, product updates, safety and security requirements, and other factors. To accomplish this objective, the system 60 may require data related to an extensive list of hardware and software, and including COTS hardware and software. Obsolescence of such COTS hardware and software could affect airline revenue and reliability, and more importantly, safety and security. Exacerbating this problem is, as noted herein, the difference in lifetimes between many COTS products and components on the one hand, and airplanes (i.e., systems) on the other. The system 60 is responsive to these issues. The processor 61 operates to receive information such as electronic PCNs or similar formatted documents for storage in the data store 65. The processor 61 also may operate to accept manual inputs of EOL data. The processor 61 receives schedule information for each of the airplanes, its current location, measured data such as flight hours, number of ascents, and other monitored data. Some of the monitored data may be supplied directly from the airplane to the system 60. The data store 65 maintains component change data for each airplane. The system 60 may receive various obsolescence notices through subscription services, the aircraft manufacturer, or the COTS product supplier. Using all the above data sources, the processor 61 may execute a program to determine which airplanes require product replacements based on received obsolescence notifications, and when the products should be replaced. In this sense, at least, the system 60 is a reactive obsolescence management system, and as such may be incorporated into or may cooperate with the product management system 90 and the product obsolescence forecast system 100.

Configuration management systems, such as the configuration management system 60 of FIG. 1A) are known, and are in use, for example, in the commercial aviation industry. For example, some elements of the commercial aviation industry have moved to Integrated Modular Avionics (IMA) systems. These IMA systems increase efficiency and reduce costs by, for example, adopting a common operating system and common device drivers. IMA systems may be found, for example, on the AirBus A380 and Boeing 787 aircraft. Associated with IMA systems may be configuration management systems that help aircraft manufacturers and operators (airlines) meet the challenge of coordinating changing FAA requirements, new designs in electronics and in aircraft structures (including, for example, control surfaces), and schedules for aircraft product upgrade/replacement. These computer-based configuration management systems may be used to monitor various avionics components to minimize the impact of product obsolescence on airline schedules, for example. The herein disclosed product obsolescence forecast systems may extract information from, and provide information to, these and other configuration management systems.

Figure 1C:
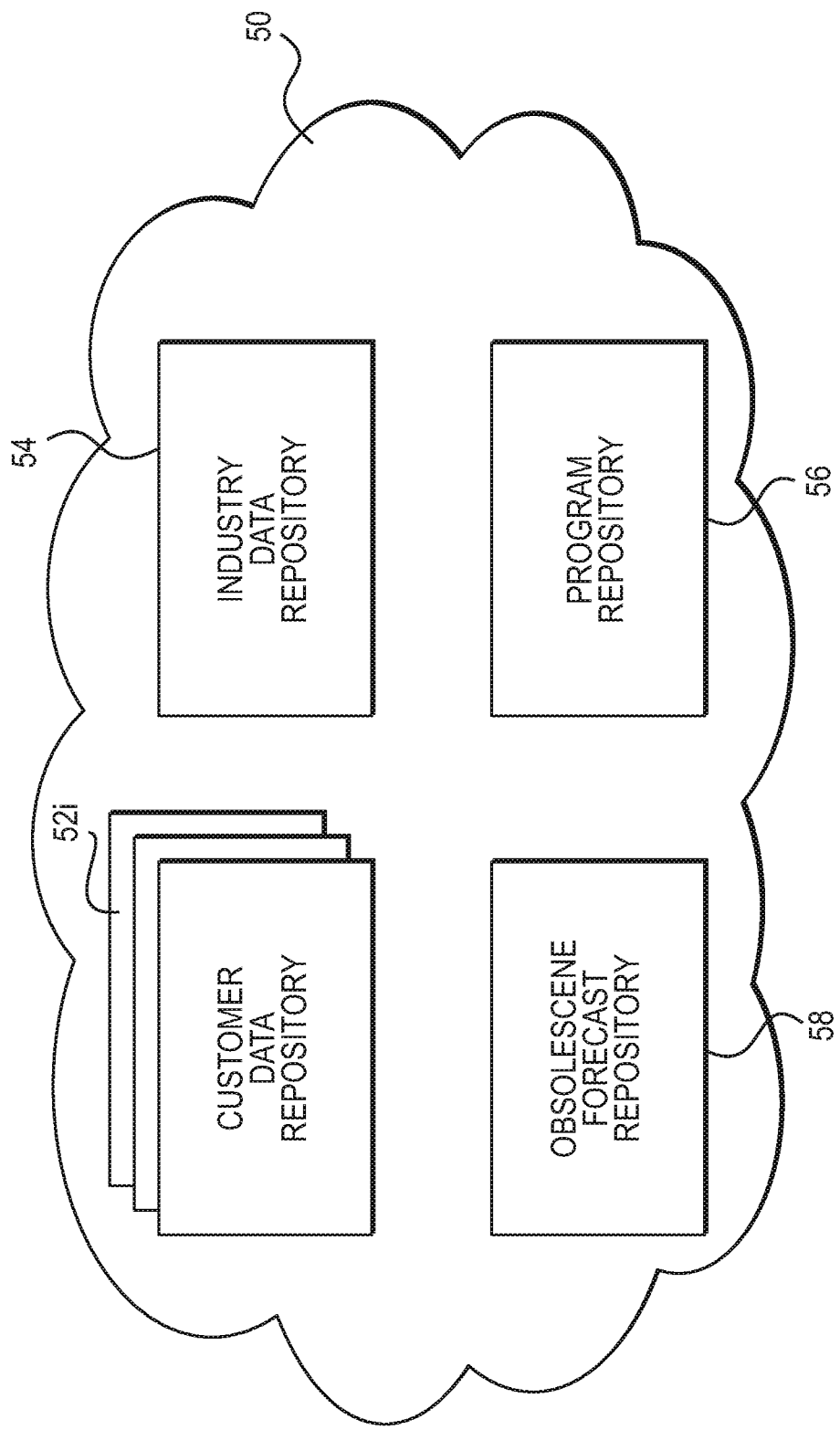

FIG. 1C illustrates aspects of certain structures, entities, and elements in the environment of FIG. 1A. In FIG. 1C, cluster 50 is seen to include data repositories 52*i* for customers 40A and 40B, industry data repository 54, program repository 56, and obsolescence forecast repository 58. A data repository 52*i* may include data related to specific customer 40A, such as a schedule of COTS products and components, system descriptions, product replacement/substitution information, and other data that may be used to manage product obsolescence and to forecast product obsolescence. The industry data repository 54 may include industry data related to one or more industries represented by the entities shown in the environment 10 of FIG. 1A. The industry data may be supplied by manufacturers, customers and other end users, commentators, bloggers, industry trade associations, trade publications, periodicals, and governmental organizations. The industry data preferably is available in electronic form and generally is supplied in electronic form, although some industry data may be entered by hand-coding. The industry data may be accessible by any of the entities shown in FIG. 1A. The industry data may comprise structured, semi-structured, and unstructured big data. The industry data may be arranged in traditional databases, in flat databases, and in other data management structures. Some data in the industry data repository 54 may be reformatted to make the data accessible and useable by the product obsolescence forecast system 100. The program repository 56 may contain programming accessible by a thin-client processor external to the cluster 50 to execute various operations at the cluster, including data access and manipulation. The obsolescence forecast repository 58 may contain obsolescence data under the control of product obsolescence forecast system 100, and may be formatted from other data provided at or through the cluster 50 such that the obsolescence data may be used by the product obsolescence forecast system 100 to forecast product and component obsolescence, including through use of a Bayesian Neural Network, a linear correlator, and/or other probability mechanisms. Such a Bayesian Neural Network is disclosed with respect to FIG. 2C; a linear correlator is disclosed with respect to FIG. 2I.

The cluster 50 may be similar in form and function to a cluster node in the familiar Hadoop scheme; i.e., a dispersed cluster. The cluster 50 may have or include the structure of cloud storage devices. Each customer 40A, 40B in FIG. 1A may have its own data repository that stores data related to obsolescence management. A customer's data repository may include classified data and thus may be protected by appropriate security safeguards. Preferably, a data repository storing classified data is not accessible through the Internet, but rather is accessible only through secure communications means. Depending on the level of classified data, the data repository, and the overall cluster may reside in a secure compartmented information facility (SCIF) with no access by devices outside the SCIF and thus, the cluster 50 may not have the form or function of a Hadoop dispersed cluster. Data repositories storing unclassified data, or non-sensitive data, may be accessible using a wide area network such as the Internet or a local area network (LAN). A LAN may be wired or wireless. Other network configurations and access and communications mechanisms are possible. The customer data repository may be maintained by the customer, or on behalf of the customer, by a third party, such as a third-party operator of the product obsolescence forecast system 100. Alternately, the customer data repository may be accessible, in whole or in part, through the product obsolescence forecast system 100.

Figure 1D:
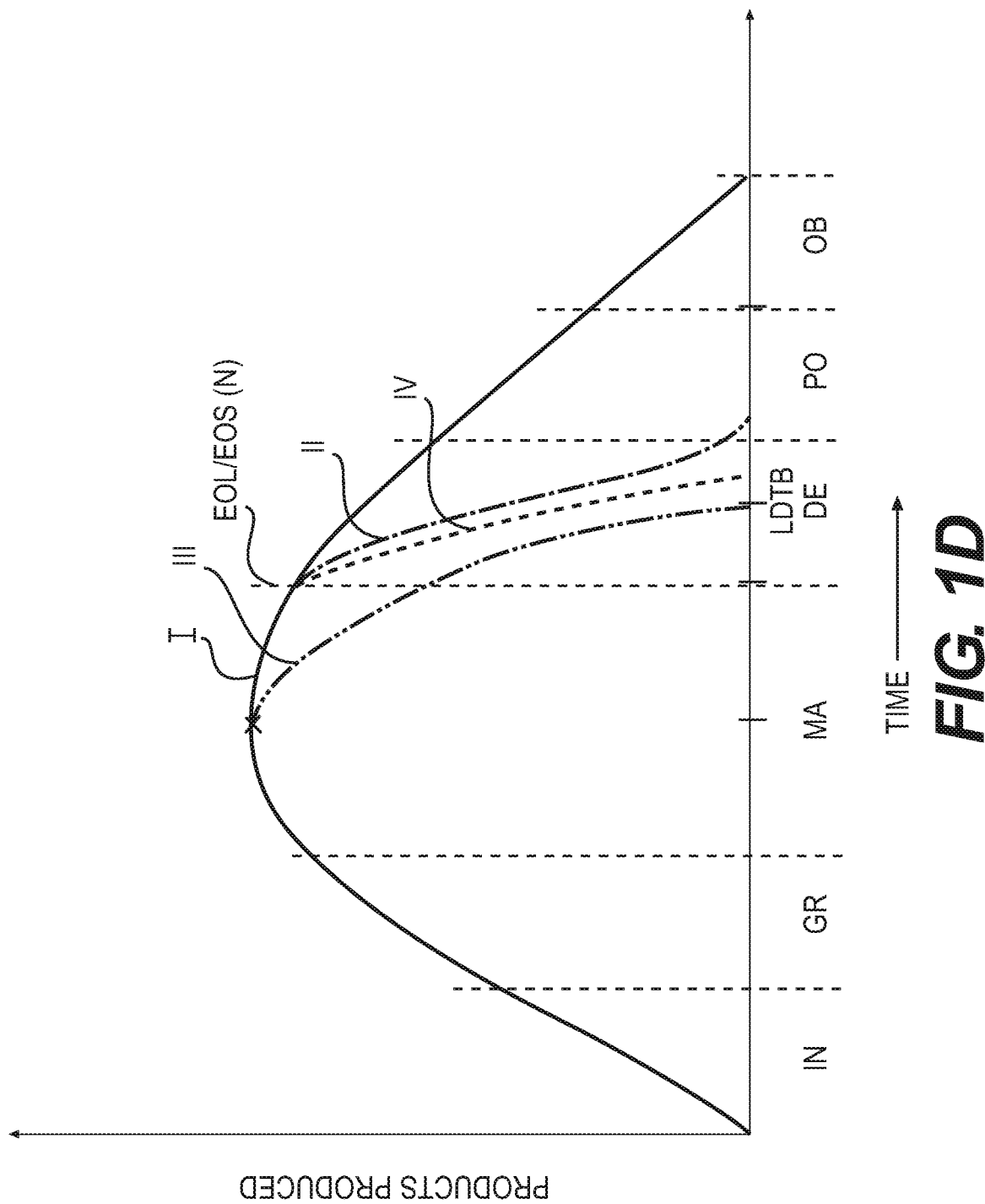

FIG. 1D graphically illustrates concepts associated with the product obsolescence forecast system 100. FIG. 1D shows product production (e.g., in terms of units produced or sold) versus time. The time scale includes periods of product introduction (IN), product growth (GR), product maturity (MA), product decline (DE), product phase-out (PO) and product obsolescence (OB). When the product is first conceived, designed, produced and/or sold, the product manufacturer may include in the product design, an expected product lifetime, shown by life cycle curve I. Curve I may have or may approximate a normal distribution. The length of the product lifetime (OB-IN) may depend on factors that are unknown and/or unknowable at the time of product introduction. At some point in the product's life cycle, the product manufacturer may determine the product will become obsolete in advance of its original expected obsolescence date. That is, the product's obsolescence date may occur earlier than the original expected obsolescence date. When the product's obsolescence date is updated to reflect an earlier date, the life cycle of the product may be reflected by curve II. Whether the product's obsolescence date corresponds to its original expected obsolescence date or an updated obsolescence date, the manufacturer may provide an EOL notice. The EOL notice may be sent to specific customers and/or may be posted on the manufacturer's Web site or otherwise made generally available. The EOL notice may include a last time to buy (LTB) date, indicating when stocks of the product no longer may be available to customers.

During the lifetime of the product represented in FIG. 1D, events may occur that could lead to product obsolescence prior to the dates shown by life cycle curves I and/or II. For example, Federal legislation may change performance requirements for products performing the functions of the product of FIG. 1D. Such a change may be used by the product obsolescence forecast system 100 to forecast an EOL date earlier than those of either curves I or II. For example, the system 100 may forecast an earlier EOL date than that of curve I, resulting in curve III. Alternately, life cycle curve IV may reflect a forecast EOL date that predates the manufacturer's EOL notice date. One effect of the earlier EOL forecasts is a change in the LTB, and the system 100 may produce a revised LTB accordingly.

FIG. 1E shows example functions of the product obsolescence forecast system 100 considering the life cycle examples of FIG. 1D. When the product's lifecycle remains as expected (designed) as shown in curve I of FIG. 1D, the system 90 executes function 91 to determine events such as LTB in advance of an expected (designed) EOL notice and function 94, impact analysis, when EOL is announced. If the manufacturer announces EOL in advance of the expected (designed) EOL date, the system 90 executes function 92 and function 94 to assess the EOL and its impact. Finally, the system 90 may execute function 93 to forecast EOL in advance of any EOL announcement (curve III) and/or in advance of an announced EOL, and subsequent impact analysis function 94. The functions 91-94 are described in more detail herein.

Figure 1F:
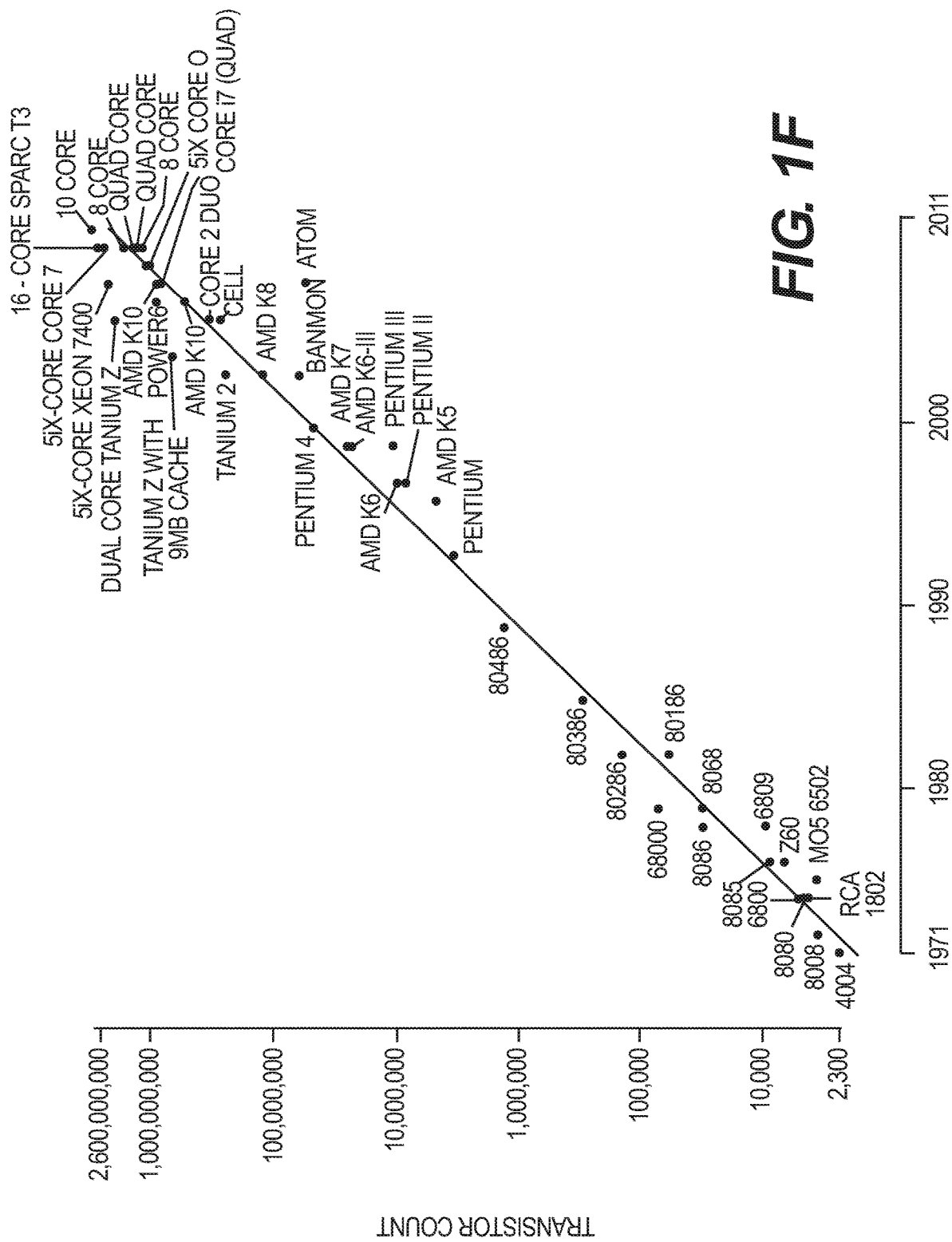
Figure 1G:
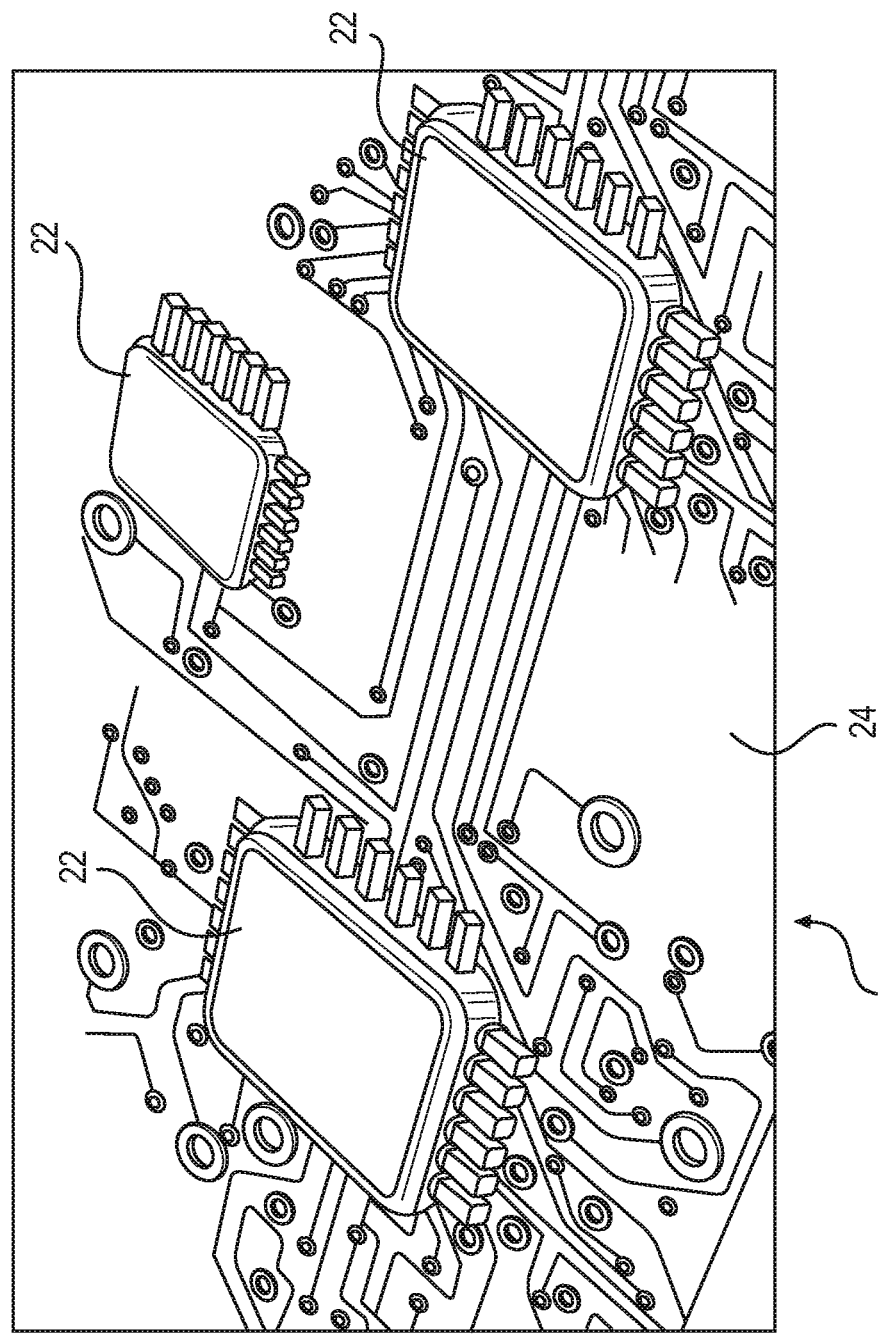

FIG. 1G illustrates an example arrangement of products; system 20 (an integrated circuit) includes a number of products 22 (chipsets or microprocessors) arranged on component 24 (a circuit board).

Figure 1H:
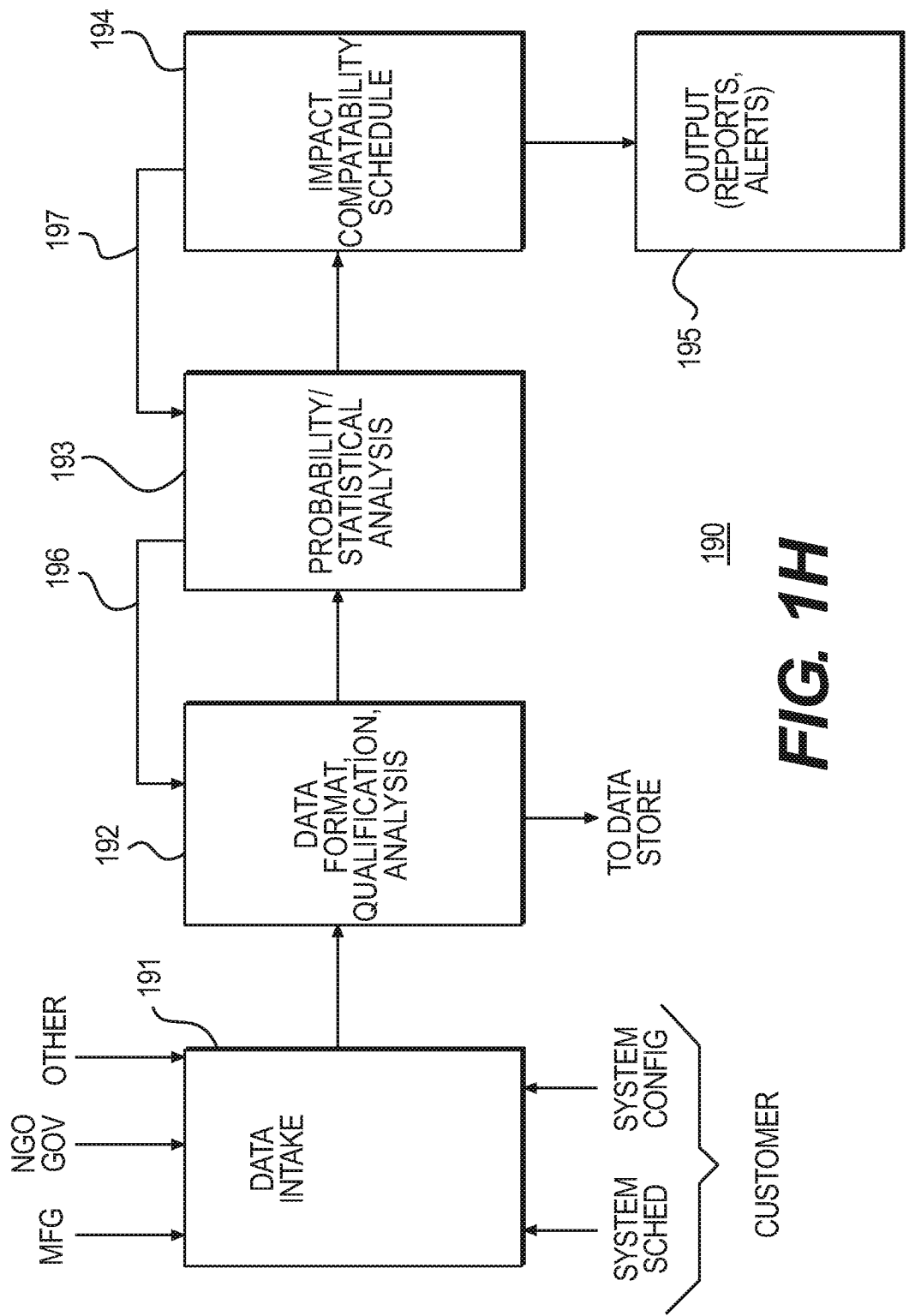

FIG. 1H illustrates a system that may be used to forecast obsolescence of products in the environment of FIG. 1A. The system may include some or all the components of systems 90 and 100. In FIG. 1H, system 190 includes product management and product obsolescence forecast components including data intake component 191, data formatting and qualification component 192, obsolescence forecast component 193, forecast analysis component 194, and output component 195. All or some components of the system 190 may be operated by or on behalf of a specific customer such as the customer 40A (see, e.g., FIG. 1A). The product may be the product 22A of FIG. 1A. The data intake component 191 accesses and takes in data in different formats including structured, semi-structured, and unstructured data from product manufacturers, government and non-government agencies and organizations, and other sources including network-based sources such as the Internet. The data intake component 191 also accesses and takes in data from the customer 40A, including data related to a system or systems operated by the customer 40A and a product or products that may be contained in or associated with the system or systems. The system and product data may include configuration data for the product(s) and system(s). The data from the customer 40A also may include schedule or availability information related to the system(s) operated by the customer 40A. The data from the customer 40A may include data and information related to the performance of a specific product; such data and information may be directly monitored using monitoring devices connected to or associated with the product. In an embodiment, the customer is the U.S. Navy or a component thereof, the systems are ships and aircraft, and the products are microprocessors used in operation of the ships and aircraft, including microprocessors installed onboard the ships and aircraft and microprocessors used in support of operation of the ships and aircraft. The data formatting and qualification component 192 receives data and information collected by the component 191; such data and information may be in or of a raw, unprocessed and unfiltered form. The component 192 may include devices to extract and distill relevant information from the input from the component 191. What information to extract and distill may be determined by an iterative process that may begin using information relative to a specific product (product of interest). This "seed" information may be scanned from information provided with the product of interest, in either electronic or hard-copy format, by the product manufacturer 30A. The seed information also may be entered manually by a human operator. The component 192 may receive additional "insight" as to what information should be collected through feedback process from the obsolescence forecast component 193. As examples, the component 192 may extract product manufacturer name and date of manufacture, date of initial product introduction, an announced EOL date and an announced LTB date, product configuration information (for a microprocessor, number of cores, transistors, speed, designation, family members, and other data). The component 192 also may format the extracted data by, for example, correcting spelling errors or other errors in the data, expanding abbreviations, converting slang or manufacturer-specific names to a consistent taxonomy for products of the class of the product of interest. The component 192 also may set a flag and/or provide an alert when specific data items are not available from the intake data and information—for example, the number of transistors in a microprocessor or a LTB date. (A data item may be structured, semi-structured or unstructured; a data item may be for example, a database or a section of a database, a blog, an email, text, a still or moving image. A data item may consist of one or more data elements.) The obsolescence forecast component 193 may invoke one or more probability or statistical models to evaluate some of the information provided from the component 192 to determine if it is possible to forecast a specific obsolescence date for the product in questions, and if so to make such forecast with a statement of confidence. If it is not possible to make such a forecast using the information provided by the component 192, the obsolescence forecast component 193 may provide feedback 196 to the component 192. If a forecast EOL is possible, the component 193 provides the forecast EOL information to the forecast analysis component 194. The forecast analysis component 194 executes various processes to determine the effects of an EOL date, including various product and system impacts, compatibility effects, system scheduling effects, and various options for product replacement, bulk buy, and sustainment. The component 194 may provide feedback 197 to the obsolescence forecast component 193, which may use the information to refine its obsolescence forecast. Various aspects of the execution of component 194 are disclosed with respect to FIGS. 2A-2M. The output component 195 provides summary information, alerts, and other data to better enable system operators cope with product obsolescence. In an aspect, the system 190 is implemented as machine instructions provided on a computer-readable storage medium.

Figure 2A:
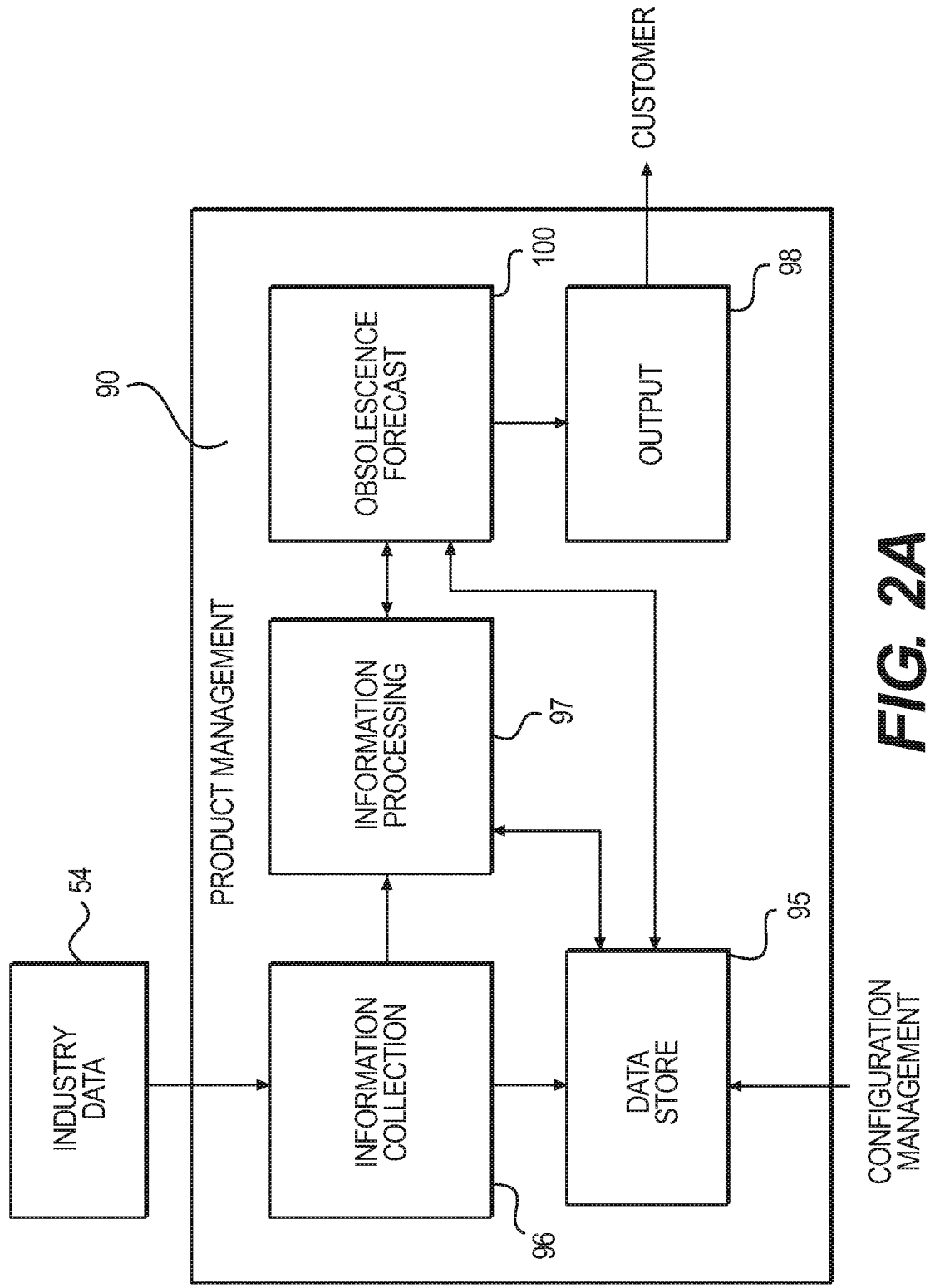
FIGS. 2A-2M illustrate example product management and product obsolescence forecast systems, system components, and system concepts.

FIGS. 2A-2M illustrate an example product obsolescence forecast system, system components, and system concepts. FIG. 2A is a block diagram of an example of the product management system 90 as shown in FIG. 1A. The system 90 may be implemented by or for the benefit of customer 40A. The system 90 may include hardware and software components. Components of the system 90 may be centrally located or may be dispersed, including dispersal in cluster 50 (see FIG. 1A) and in similar clusters. The system 90 includes information collection system 96, which receives information, processed data, and raw data from external data source 70 and other external data sources and internal data store 95, which stores data from processes executed through the information collection system 96 and other components of the system 90 (and the system 100). The system 90 further includes information processing system 97, which, among other functions, formats information and data collected by system 96 and provides the formatted information to the product obsolescence forecast system 100. Finally, the system 90 includes output system 98, which provides various information products to other components of the system 90 and to human users of the system 90. Further description of the systems and components of the system 90 are described with respect to FIGS. 2B-2M.

Figure 2B:
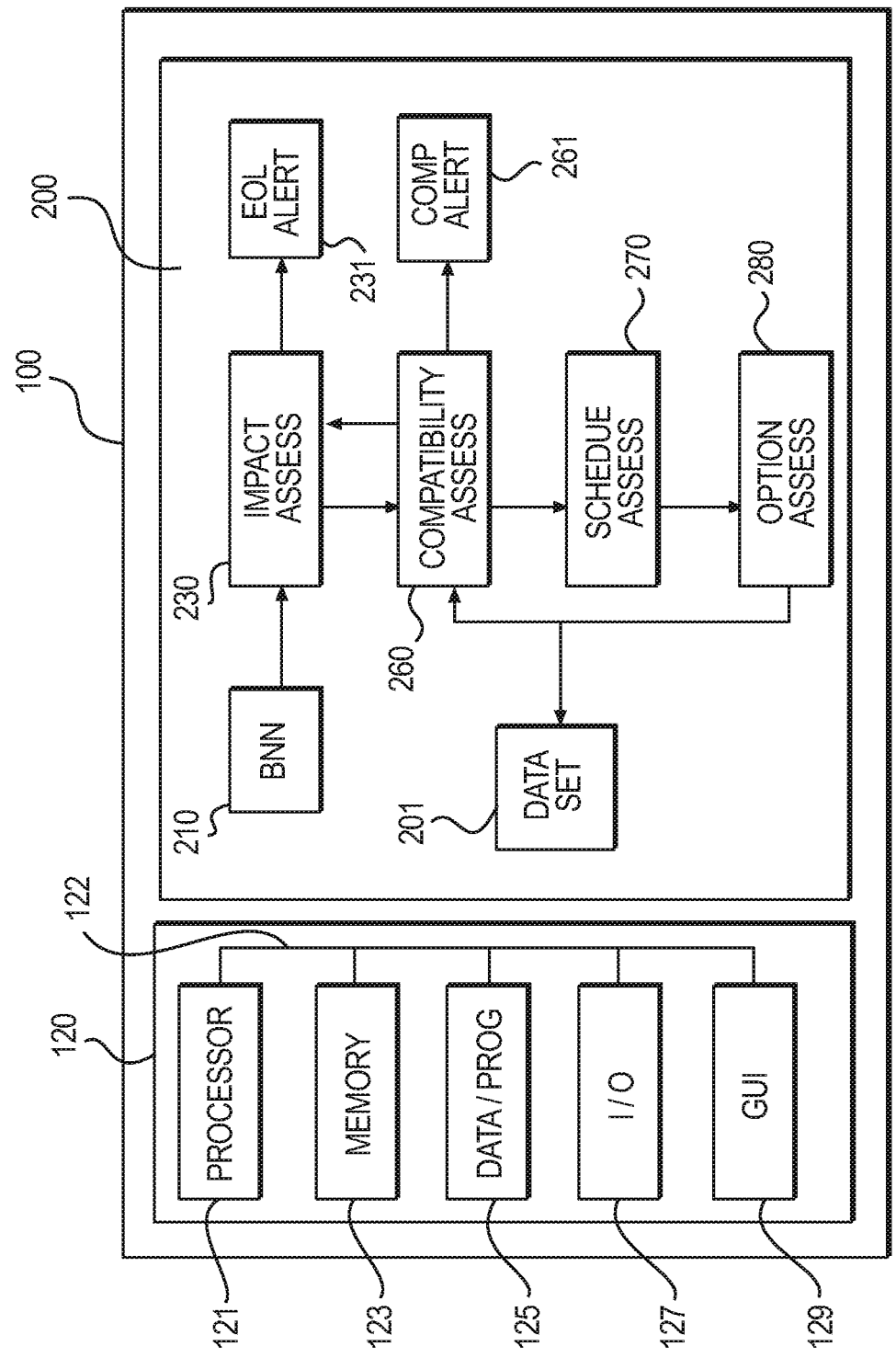

FIG. 2B illustrates product obsolescence forecast system 100 as may be implemented in the environment 10 of FIG. 1A. In an aspect, the product obsolescence forecast system 100 includes machine instructions stored in a non-transitory computer readable storage medium such as the database 125. Processor 121 executes the machine instructions to access data items related to a first product (such as the microprocessor 251 (see FIG. 2E)) and one or more second products (e.g., microprocessors) designated as similar to the first product; the first product and each of the one or more second products belonging to a class of products (e.g., a class of microprocessors). The processor 121, or another processor, extracts data elements from the data items, reformats the data elements as analyzable data elements and stores the analyzable data elements in an analyzable data structure; applies a probabilistic model to selected ones of the analyzable data elements to provide a forecast obsolescence date for the first product; and using the forecast obsolescence date, determines one or more impacts based on the forecast obsolescence date. In another aspect, the system 100 includes machine instructions, stored in a non-transitory computer readable storage medium, that, when executed, cause a processor 121 to forecast that a first product will have an end of life (EOL) within a set time frame using a probability/statistical model; identifying systems comprising the first product and determining impacts of the forecast EOL on the identified systems, determining the impacts including defining a replacement product for the first product, determining viability and cost of a bulk buy option of the first product, determining a cost for replacing the first product with the replacement product, and determining a schedule for each of one or more of the systems for replacing the first product. The processor 121 also executes the machine instructions to determine a compatibility of the replacement product in the one or more systems; and determine the cost of replacing including determining the cost of replacing based on the determined schedule. The processor 121 further executes the machine instructions to access and search a plurality of data sources, including, as necessary, determining a schema of one or more of the plurality of data sources, the plurality of data sources including structured, semi-structured, and unstructured data sources, to identify and retrieve one or more data items relevant to the determination of the product obsolescence forecast; store the retrieved data items; and extract and store one or more data elements from the one or more data elements. In FIG. 2B, system 100 is in communication with, and may be operated by customer 40A. More specifically, the system 100 may interact with configuration management system 60 (see FIG. 1A) when implemented by customer 40A. The system 100 also may be in communication with cluster 50, and in particular, industry data repository 58 and customer data repository 52A, when the data repositories are implemented at cluster 50. Alternatively, the system 100 may access a standalone or local industry data repository and a standalone or local customer data repository, including internal data system 95 of FIG. 2A. Other data structure arrangements and architectures are possible. The customer 40A is in communication with systems 20*i*.

The system 100 includes hardware components 120 and software components and data structures 200. The hardware components 120 include processor 121, memory 123, data store 125, I/O 127, and display (GUI) 129, all of which are connected by system bus 122. The processor 121 accesses data and programming in the data store 125 and may store data and programming in memory 123. The processor 121 may receive inputs and provide outputs through I/O 127 and the display 129. In an embodiment, the processor 121 may be a thin client and much of the software and data structures may be at a location remote from the customer 40A, such as in cluster 50. In another embodiment, all components of the system 100 are located at a site operated by the customer 40A The software components and data structures 200 include analyzable data set 201 (see FIG. 2J), Bayesian Neural Network 210, impact assessment module 230, compatibility assessment module 260, schedule analysis module 270, and option assessment module 280. The Bayesian Neural Network 210 is described with respect to FIG. 2C, the impact assessment module 230 is described with respect to FIGS. 2D and 2E, the compatibility assessment module 260 is described with respect to FIG. 2F, the schedule analysis module 270 is described with respect to FIG. 2G, and the option assessment module 280 is described with respect to FIG. 2H.

Figure 2C:
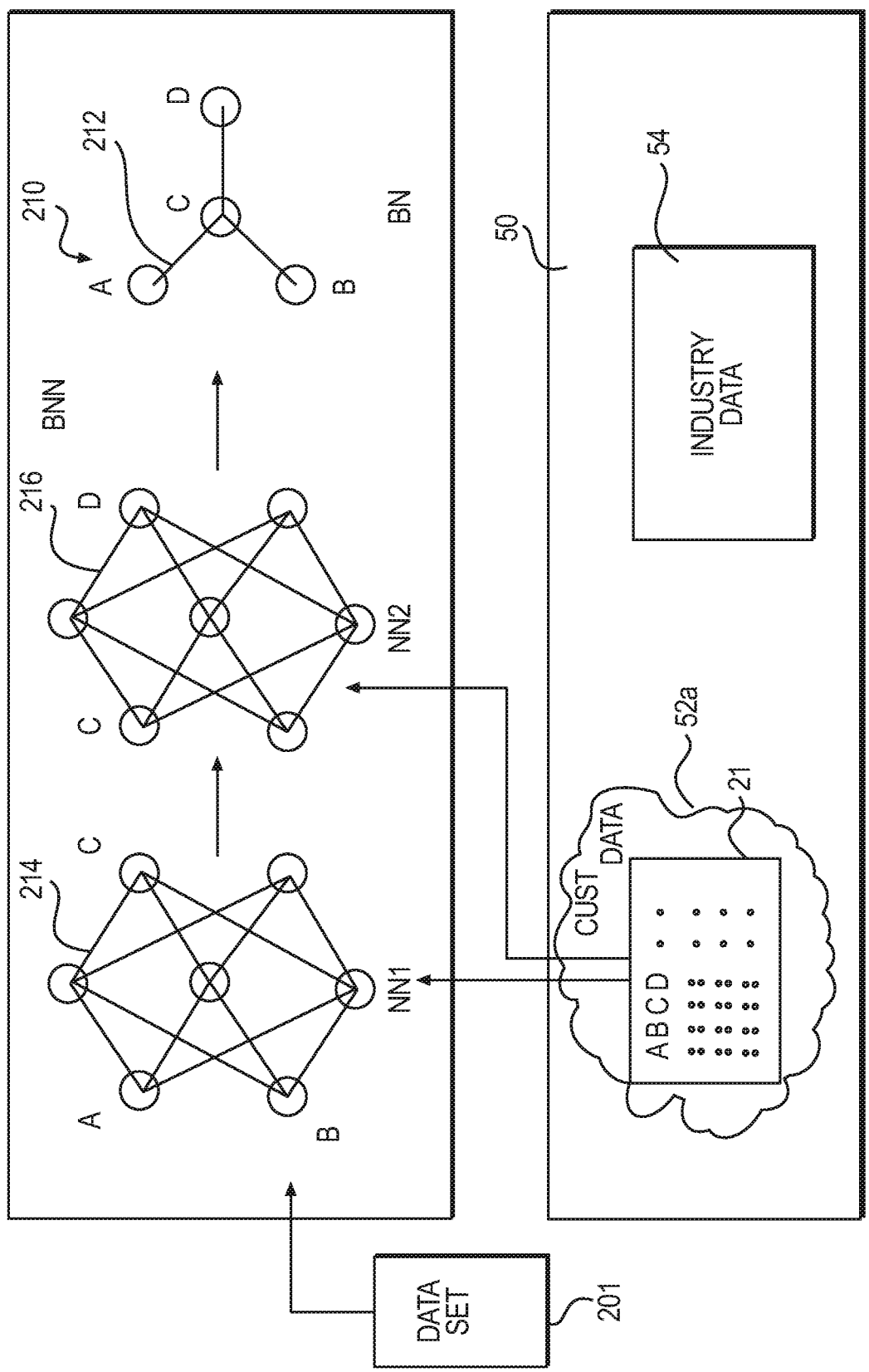

In environment 10 of FIG. 1A, many variables may be random and unknown (e.g., system noise, incomplete observations, dynamic changes in the environment). To account for these factors, the system 100 may include mechanisms that forecast obsolescence in the presence of random and uncertain variables by representing conditional dependency among the random and uncertain variables. The mechanisms may use as a data input statistical data sampled in the environment 10. Moreover, the mechanisms handle many kinds of variables present in the environment 10. In an embodiment, the mechanisms include a Bayesian network trained using neural network concepts. The neural network provides a general framework for representing and learning non-linear conditional probabilities mixed with continuous, discrete, multi-valued, and multi-dimensional variables. The Bayesian network may be expressed visually as a directed acyclic graph. A simple, example Bayesian network is shown in FIG. 2C, and includes multiple nodes, each of which represents one or more random variables in the environment 10, and each of which has conditional probabilities. Directed links in the network represent dependencies between nodes.

Before describing operation of mechanisms shown in FIG. 2C, a general explanation of the operation of a trained Bayesian network is provided using an even more simplified network structure. For simple Bayesian network X→Y, the conditional probability $P(Y|X)$ can be computed when information about X is available. Thus, the posterior probability distribution of Y given $P(X)$ is computed by operation over the sample space $\Omega_x$ of X by:

$$P(Y=y)=c\int_{x\in\Omega_x}P(y|x)dP(x), \quad \text{EQN 1}$$

where c is a constant.

In the environment 10 of FIG. 1A, the simple Bayesian network X→Y may not be sufficient to forecast or predict the probability of product obsolescence because many different (and random) variables may affect probability, and the effects may be unknown. To address this problem of representing conditional probabilities with many kinds of variables, the Bayesian network X→Y may be constructed with probabilities defined through use of a neural network. For ease of description, this "trained" Bayesian network is referred to hereafter as a Bayesian Neural Network (BNN). A neural network can handle both discrete variables and continuous variables in the same manner. When Y is a discrete random variable, $Y=(y_1; y_2; \ldots; y_k)$, k neurons can represent the probability vector of Y, $P(y_1); P(y_2); \ldots; P(k)$ with normalization to make the sum equal to 1. In a typical feed forward neural network, input neurons represent X, output neurons represent Y, and hidden neurons connect the input and output neurons. Then, conditional probability $P(Y|X=x)$ may be represented as $$f_k(x) = g\left(\sum_j v_{jk} g\left(\sum_i w_{ij}x_i + b_j\right) + b_k\right) \quad \text{EQNS 2}$$

$$g(x) = \frac{1}{1+\exp(-x)}$$

$$P(y_k|x) = f_k(x) / \sum_k f_k(x)$$

By using a neural network to represent the conditional probability of node Y, the Bayesian Neural Network (BNN) may be constructed. In an embodiment, the BNN represents a solution to the following:

$$P(A|B) = \frac{P(B|A)*P(A)}{P(B|A)*P(A)+P(B|D)*P(D)}, \quad \text{EQN 3}$$

where
P(A|B) is the probability that a product will go EOL within a set time given industry data for similar products;
P(A) is the probability of a product going EOL within a set time;
P(B) is the probability of a product going EOL based on industry averages;
P(B|A) is the probability of similar products having EOL dates within the set time given the product EOL date;
P(D) is the probability that a product will not go EOL within the set time [P(D)=1−P(A)]; and
P(B|D) is the probability of similar products having EOL dates within a time frame given that a product will not go EOL.

Thus, for a product of concern (semiconductor 251) and similar products N, Equation 3 is based on similarity of one or more features (e.g., as expressed as data elements) between semiconductor 251 and the products N. Semiconductor 251 may or may not have been introduced with an announced EOL date. Customer 40A is concerned that semiconductor 251 may go EOL within a set time—the set time may be the next 12 months, for example. Thus, if semiconductor 251 has an original, announced EOL date, customer 40A is concerned that semiconductor 251 will go EOL within the time period running from 12 months before the original, announced EOL date up to the original, announced EOL date (the "set time"). If semiconductor 251 does not have an original, announced EOL date, customer 40A may be concerned that semiconductor 251 will go EOL within the next twelve months. Semiconductor 251 is similar to product N in one or more respects, or features, and the execution of Equation 3 is based on similarity of the one or more features common to semiconductor 251 and product N. In a specific example, the similar feature is the originally-announced product EOL date—which for purpose of illustration may be 3 years after product introduction. Some of the N products may have an actual EOL date in advance of the original, announced EOL date. The actual EOL dates may form a normal distribution in a period from 2 years to 3 years with a mean and median actual EOL within the time period. Note that many other features may be used as the basis for Equation 3. For example, for semiconductor 251, these other features could be the number of transistors (transistor density), on core cache, semiconductor fabrication technology (expressed, for example, in nm—22, nm, 14 nm, 10 nm), the number of cores, processor speed, etc. Furthermore, the Bayesian analysis that begins with the execution of Equation 3 may be applied to multiple product features (e.g., to EOL dates, transistor count, core number). However, as explained herein, some features may correlate—for example, processor speed is a function of transistor density and use of on chip caches; fabrication technology determines, to some extent, transistor density—and use of two or more such correlated features may bias or skew the obsolescence forecast. In an aspect, the system 100 may account for such correlatable product features.

Turning now to FIG. 2C, BNN 210 includes Bayesian network 212 and neural networks 214 and 216. Bayesian network 212 includes parent nodes A and B and child nodes C and D. The child nodes C of the Bayesian network 212 are represented by the output neurons, and the parent nodes A and B are represented by the input neurons of the neural network 214. Conditional dependency between C and D (node C is the parent of child node D) is represented by input and output neurons of another neural network 216. Thus, each child node C and D of the Bayesian network 212 has its own neural network 216. The number of input neurons of the neural network 212 (and the neural network 216) is determined by the dimension of the parent node and the number of output neurons is determined by the dimension of the child node. For discrete variables, integral operations, equations (1) and (2) can be computed in a straight forward way. In the case of continuous variables, the BNN 210 may employ Monte Carlo sampling and numerical integral operations.

Returning to the simple Bayesian network X→Y, if enough data exist for the parent node and child node, a neural network can be trained to approximate the conditional probability P(Y|X) for the child node Y given X by back propagation. (For the more complex Bayesian network 212 of FIG. 2C, the approximate conditional probability may be represented as P(C|A, B), etc.). When multiple child nodes are used, each neural network is trained with corresponding data sets of parent and child nodes.

Learning continuous conditional probability P(Y|X) approximates nonlinear functions, $\mu\gamma(X)$ and $\mu\sigma(X)$, where $\mu\gamma y(X)$ is given by the mean of Y given X. The training set of $\mu\sigma(X)$ may be given by computing the standard deviation of Y given X. To implement training of the neural network(s), each node may be defined and specific datasets and algorithms can be assigned to each node. For conditional probabilities in the system, different representations are possible. One such representation is in the form of a conditional probability table for discrete variables. Connecting to a database, the system can calculate a corresponding conditional probability from the frequency of particular conditions in the database. The other representation is a neural network style for both continuous and discrete variables. By connecting to a database, the neural network can be trained with a supervised dataset in the database. The system also can monitor the learning curve of the back propagation and the learning process is converging with small error, then the neural network successfully approximates the corresponding conditional probability. Thus, success in learning means the structure of the network 212 is justified by the fitting to statistical data.

After successful training, a neural network can represent the conditional dependency between corresponding parent nodes and child nodes. Note, however, that if conditional dependency between the parent and child nodes does not exist, the learning process may not converge (i.e., learning may fail). One aspect of this lack of convergence is that this training scheme may be used to detect conditional dependency between the variables represented by the nodes.

Figure 2D:
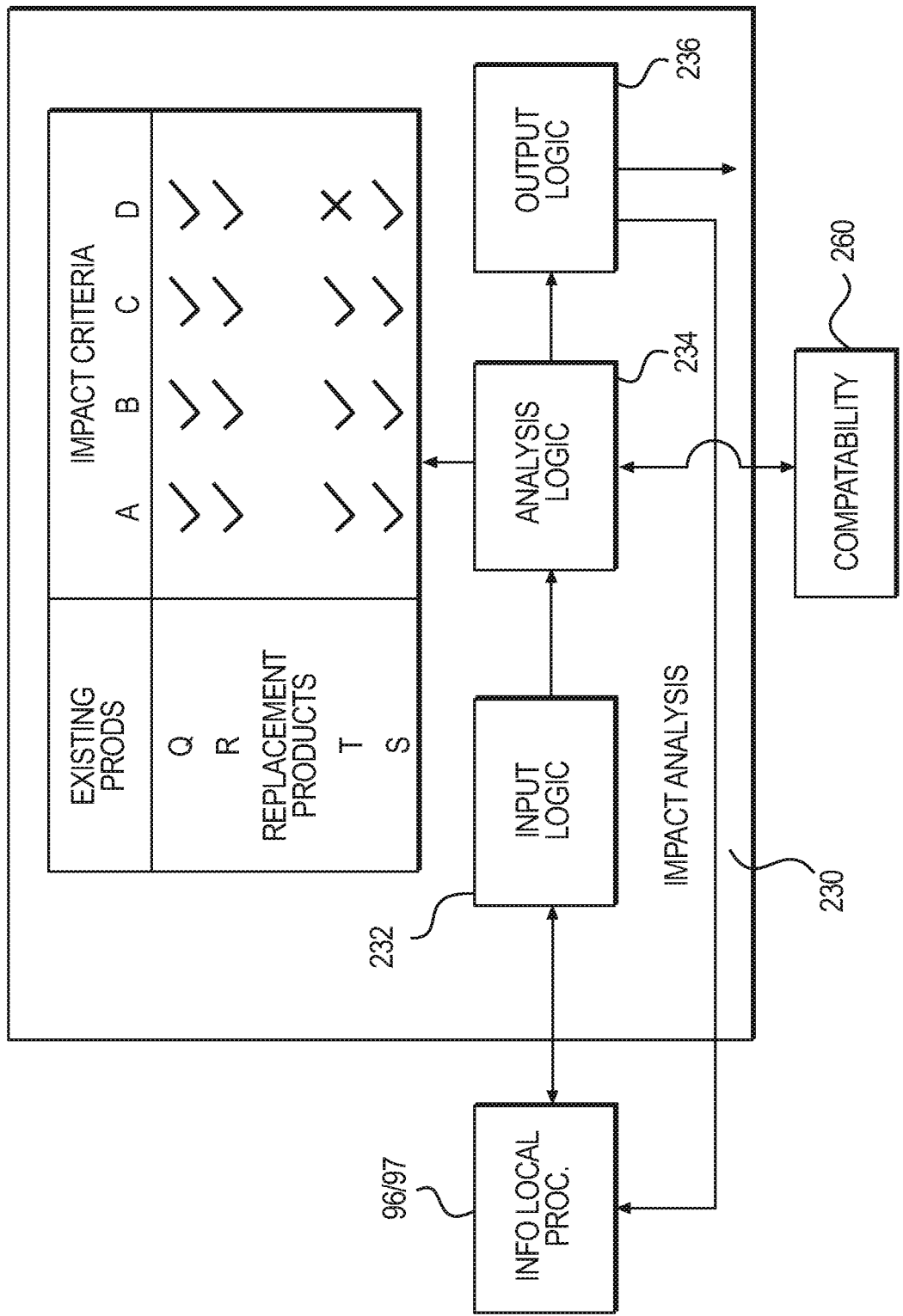

FIG. 2D illustrates impact assessment module 230. The module 230 includes program instructions that when executed, assess the impact of obsolescence of certain products. In the example of FIG. 2D, the processor 121 (FIG. 2B) executes the module 230 program instructions to assess the impact of an announced EOL for products Q and R (to be replaced by products T and S). The module 230 includes filtered input logic 232, analysis engine 234, and output logic 236. In an embodiment, the input 232 receives structured, semi-structured, and unstructured data from raw data and information from sources such as EOL notifications, manual (i.e., human-sourced) data, bill of materials data, material characteristics data, replacement equipment information, and similar data. As an example, information from an EOL notification (e.g., in a PCN) may be abstracted or extracted from the actual PCN, formatted, stored in a database (e.g., the data set 201—see FIGS. 2B and 2C), and the database may be accessed by the filtered input logic, which reads a product name and announced EOL data for an existing product, such as the product Q and/or the product R. In another embodiment, the input 232 receives information formatted by processor system 97.

Figure 2E:
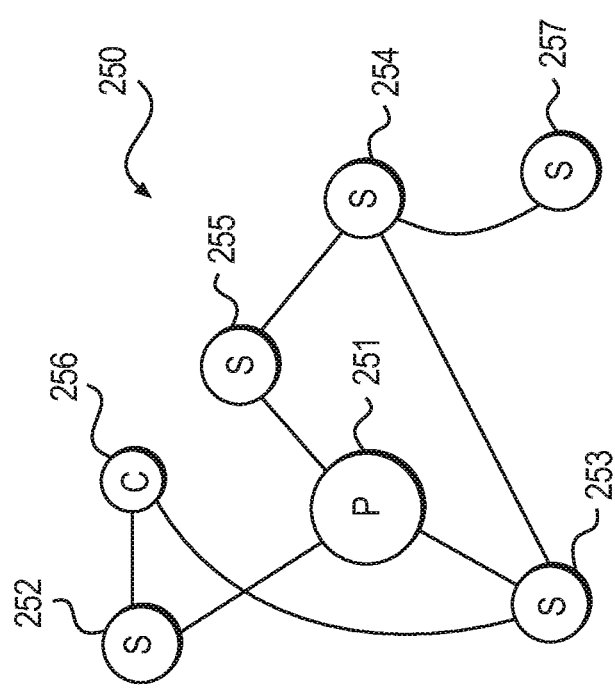

The compatibility assessment module 260 may analyze relationships in a network of related systems, products, and components once one or more of these assets is scheduled to go obsolete, or simply goes obsolete, to determine the effects of such obsolescence beyond just the effects of the asset itself going obsolete (i.e., just the requirement to replace the asset). FIG. 2E illustrates example network map 250, which includes relationships and dependencies among assets (systems, products, components, and so on) as indicated by links or paths connecting systems S (252, 253, 254, and 255), product P (251), and component C (256). If product 251 (see the example of FIG. 1G, where product 251 corresponds to chipset or microprocessor 22) goes obsolete, systems 252, 253, and 255 can be seen to be directly affected—that is, the product 251 is used in each of these three systems. In addition, if product 251, which as shown is incorporated in systems 252 and 253, requires replacement, such replacement could affect component 256, which also is incorporated in systems 252 and 253. Similarly, system 254 could be affected by replacement of product 251 in systems 253 or 255. In the example network map 250, product 251 may be a microprocessor for which an EOL notice has issued, system 253 may be a processor that uses the microprocessor 251, system 254 may be an avionics system that communicates with the processor 253, and system 257 may be an airplane that uses the avionics system 254. When the microprocessor 251 goes obsolete, the effects may ripple through the assets shown in the network map 250. For example, a replacement microprocessor installed in processor 253 may prevent communication of the processor 253 with avionics system 254, requiring replacement or updating parts of the avionics system 254 and consequent temporary removal of the airplane 257 from service.

Figure 2F:
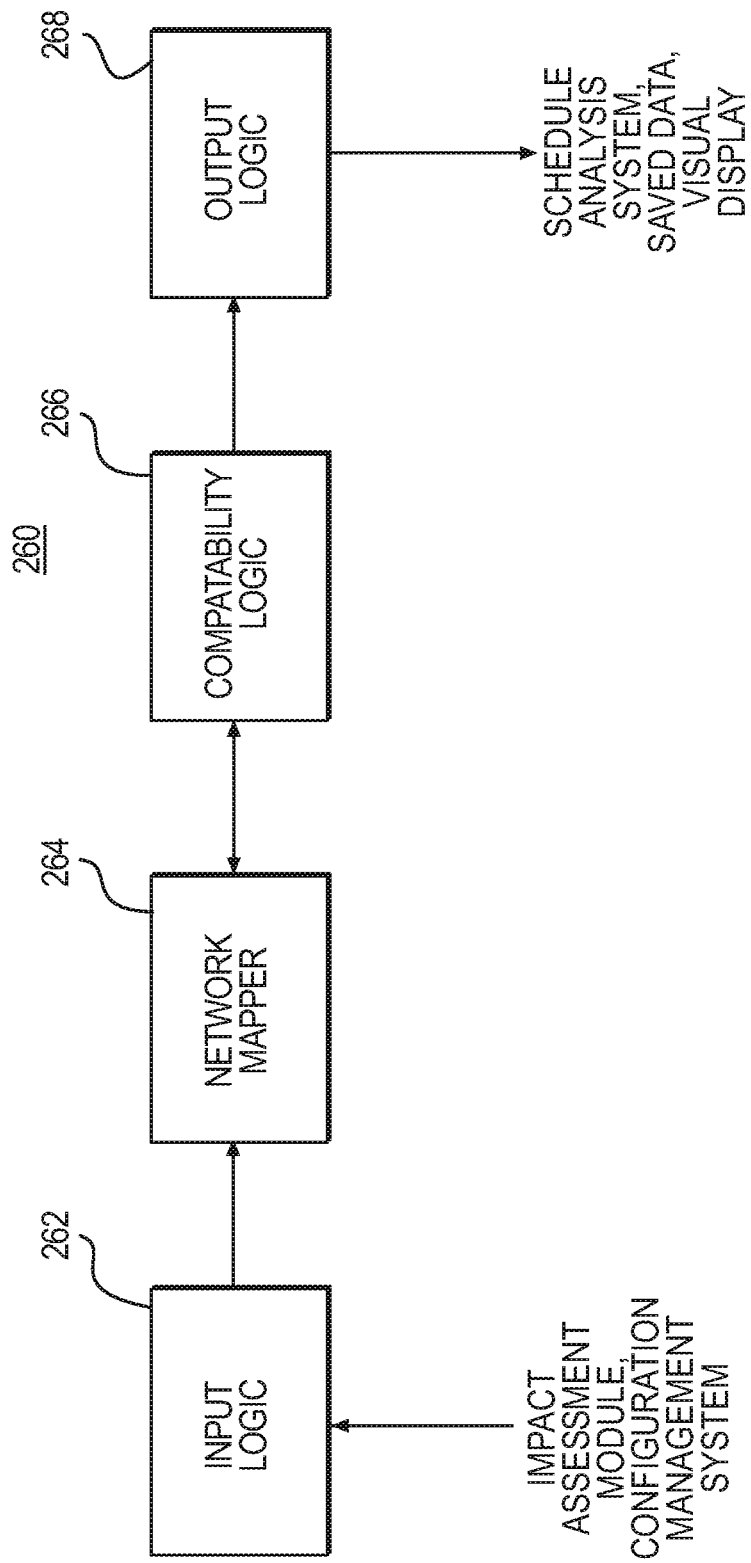

FIG. 2F illustrates compatibility assessment module 260, which, when executed, assesses the effects of a product going obsolete on other assets that are related to or similar to the product (e.g., the system impacts of replacing existing hardware or software due to COTS obsolescence). The relationships may be expressible in the format of the example network map 250 shown in FIG. 2E. The module 260 includes input logic 262, network mapper 264, compatibility logic 266, and output logic 268. The input logic 262 receives filtered or formatted data from the impact assessment module 230 and the configuration management system 60. Information from the impact assessment module 230 may include noticed EOL dates, forecast EOL dates, LTB information (if available and different from an EOL date), and other information. Information from the configuration management system 60 may include component and product versions, dependency data for components, products, and systems, maintenance requirements, certification data, and other information to determine relationships and dependencies among assets, as well as replacement criteria. For example, a product may incorporate a specific component, but when the product requires replacement, the existing component should or must be replaced with a new, upgraded version of the component.

The input logic 262 provides aspects of the received information to the network mapper 264 and the compatibility logic 266. The compatibility logic 266 and the network mapper 264 cooperate to generate a dependency and relationship map. This map may be expressed visually in a form similar to the example network map 250 of FIG. 2E. In an aspect, the network map 250 may be displayed visually on an electronic display such as a computer monitor or may be printed. In addition, the network map 250 may be saved in the system 100. The compatibility logic 266 analyzes the status of assets along paths of the network map 250 to find potential problems with a deployed asset. The logic 266 also may predict problems that might occur if an asset is upgraded. The logic 266 may analyze an inability to map certain assets as an indication those assets are not impacted by the product going obsolete. The output logic 268 may output indications of potential problems associated with hardware/software changes and the network map of the affected components or systems in the network and may feed an updated output of EOL interdependency conflicts to the schedule analysis system 270.

Using the microprocessor EOL example from above, the input logic 262 receives EOL dates and other information related to microprocessor 251 and passes the microprocessor information to the network mapper 264 and compatibility logic 264. The logic 264 checks the existing hardware and software interdependency network map 250 and finds that the microprocessor 251 directly affects operation of processors 252, 253, and 255. Processors 253 and 255 in turn communicate with system 254, which may include a processor that has an unsupported software version. The processors with replacement microprocessors must be able to communicate with a processor in avionics system 254, which means that processor in avionics system 254 also must be given an updated microprocessor. The output logic 268 sends the information of the microprocessor 251 and the affected processor of avionics system 254 to the impact assessment module 230 (see FIG. 2D) to determine impacts associated with the microprocessor replacements. The module 230 then sends the impacts back to the compatibility module 260 to check compatibility of the replacement microprocessors based on new impacts. Finally, the compatibility module 260 sends the conflicts to the schedule analysis module 270, where airplane schedules are checked based on the microprocessor EOL dates.

Figure 2G:
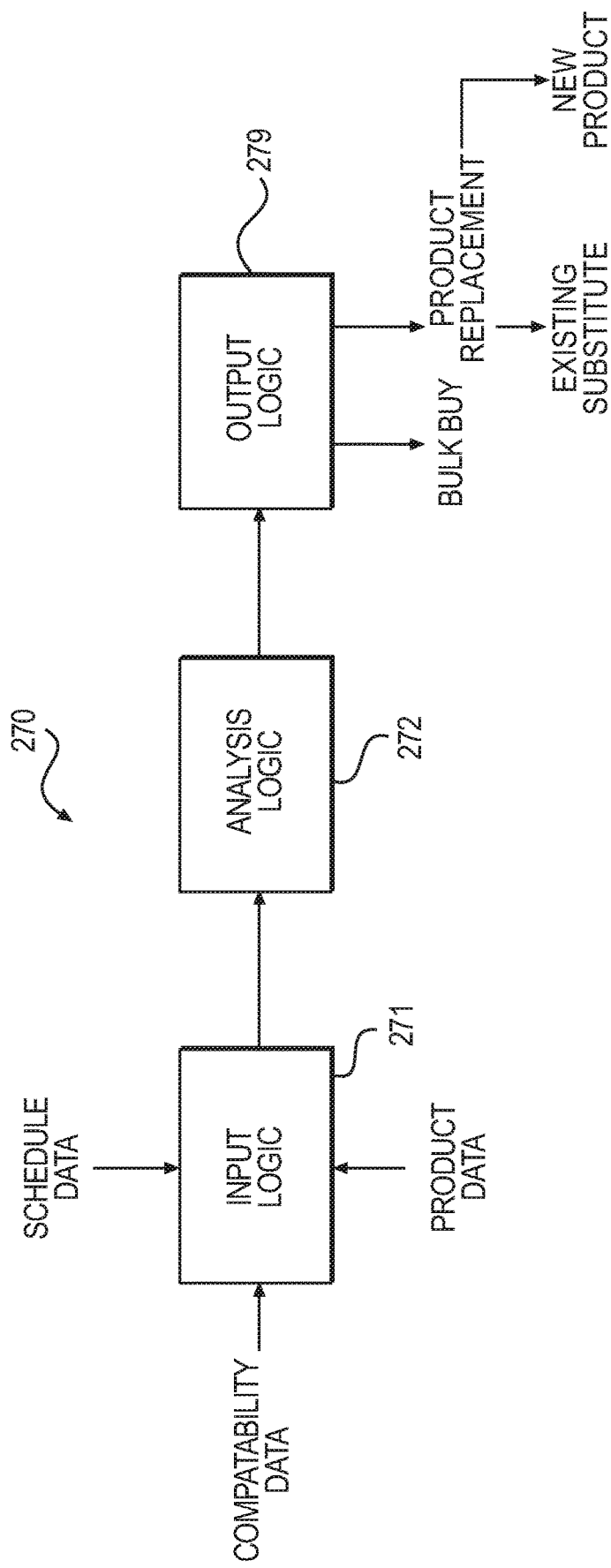
Figure 2H:
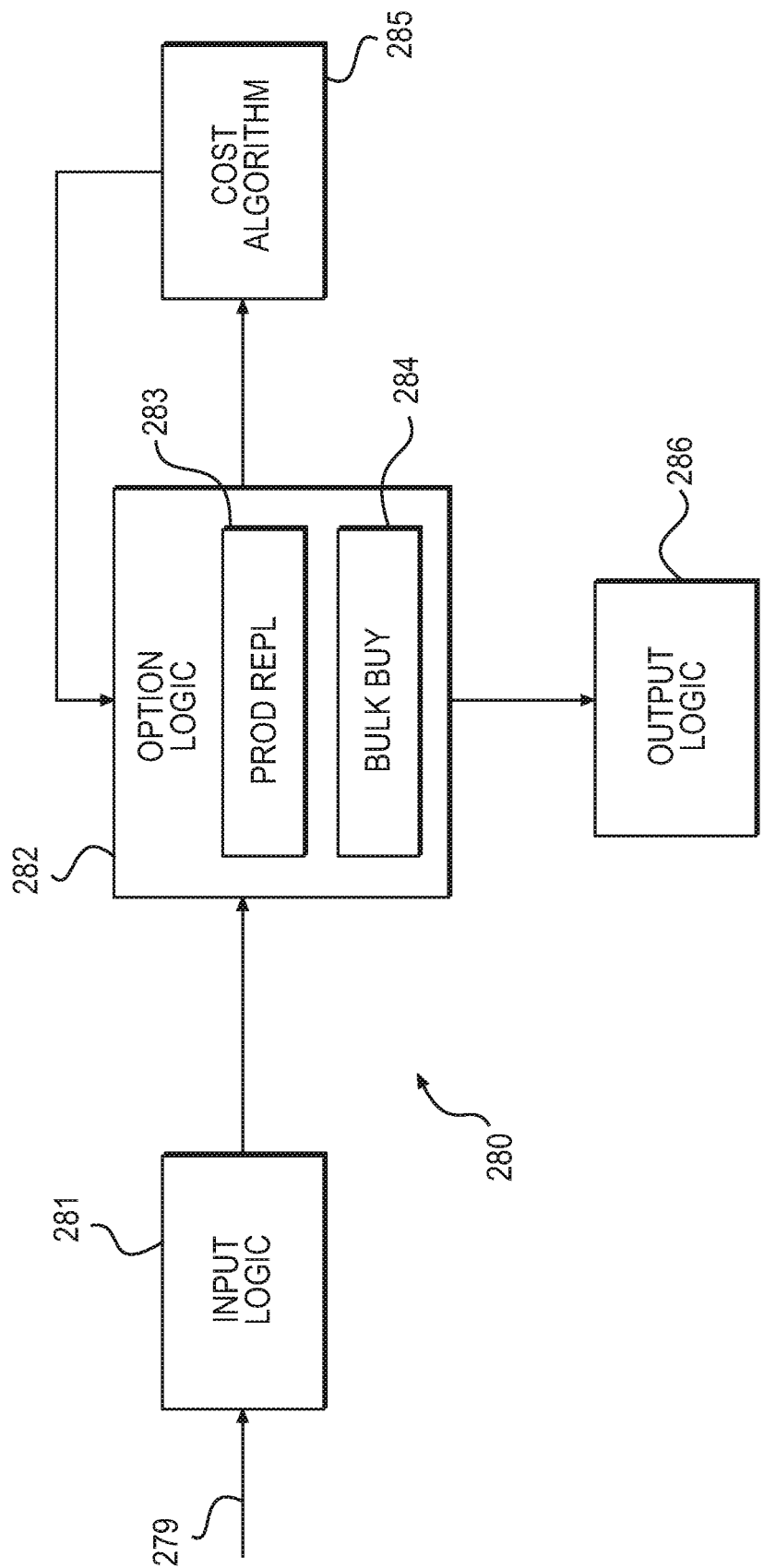

FIG. 2G illustrates schedule analysis module 270, which may be used to compare planned product replacements with known EOL information to determine an optimal product replacement schedule considering schedule impacts on systems receiving replacement products. The schedule analysis module includes input logic 271, schedule analysis logic 272, and output logic 279. The input logic 271 receives as inputs system configuration information, system schedule information, and EOL impacted systems, products, and components information. The input logic 271 further receives historical cost information and existing cost information for product replacement. The system configuration information may include information from a database of product versions and the metadata, status, and direct dependencies for each product version (see FIG. 2E). The schedule analysis logic 272 computes direct and indirect dependencies for a given product considering schedule scheduling and availability information, computes the consequences of upgrading the given product from the network map (e.g., network map 250 of FIG. 2E). Using the system configuration, schedule, EOL alerts and cost information, the schedule analysis logic 272 determines possible options for replacing or sustaining the EOL product. The options include (1) a bulk buy for sustainment of an EOL product (i.e., a product going obsolete) before the announced or forecast EOL, (2) a complete requalification and replacement of the EOL product, and (3) when no new products for replacement are available before EOL, a replacement of the EOL product using the removed equipment to support the remaining installed EOL products until all can be replaced with new products. Other options may be possible. The schedule analysis logic 272 may provide a suggested action derived from one of these options using either a necessity requirement or a most cost effective requirement. To support these two requirements, the schedule analysis logic 272 may determine cost at each decision point using a cost algorithm that computes if bulk buying the EOL product or requalifying and sustaining it is less expensive over a determined time frame. To enable execution of the above-described functions, the schedule analysis logic 272 includes option analysis unit 280, which is described with respect to FIG. 2H FIG. 2H illustrates option analysis unit 280, which includes input logic 281, option logic 282, which includes product replacement logic 283 and bulk buy logic 284, cost algorithm 285, and output logic 286. The input logic 281 receives data from the output logic 279 of the schedule analysis module 270. The product replacement logic 283 contains algorithms that execute to determine if total replacement of EOL products is possible before an announced EOL and/or a forecast EOL. The bulk buy logic 284 executes to determine if a bulk buy scheme is possible. The cost algorithm 285 executes to determine the costs of various options, including the cost of total product replacement versus bulk buy from existing stocks of the product for sustainment (options 1 and 2). The cost algorithm 285 also executes to determine if bulk buy from existing stocks of the products is less expensive than product sustainment from existing stocks of the product while replacing the product with new products (option 3). The output logic 286 provides various outputs, including a specific output depending on execution of the algorithm 280a. For example, if total replacement is possible and if total product replacement is the least expensive option, the output logic 286 makes a total product replacement suggestion (option 2), and if bulk buy for sustainment is the least expensive option, the output logic makes a bulk buy for sustainment suggestion (option 1). The output logic 286 also suggests bulk buy from existing stocks whole waiting to replace the product with new products (option 3) when the algorithm executes to show this is the least expensive option.

FIG. 2C illustrates aspects of a Bayesian Neural Network 210 that may be used in a process to forecast product obsolescence. Optionally, the product obsolescence forecast system 100 may include other probability and statistics-based components that may be used in the forecasting process. One such component is correlation module 290, shown in FIG. 2I. Dependence is a statistical relationship, whether causal or not, between two random variables or two sets of data. Correlation is any of a broad class of statistical relationships involving dependence, though in common usage it most often refers to the extent to which two variables have a linear relationship with each other. Correlations are useful because they can indicate a predictive relationship; however, correlation is not sufficient to demonstrate the presence of such a causal relationship (i.e., correlation does not imply causation). Moore's law, illustrated graphically in FIG. 1F, is a well-known expression of a correlation of time versus transistor density that on its face, cannot be said to imply a causal relationship. Formally, dependence refers to any situation in which random variables do not satisfy a mathematical condition of probabilistic independence. While correlation may refer to any departure of two or more random variables from independence, technically correlation refers to any of several more specialized types of relationship between mean values. There are several correlation coefficients, often denoted $\rho$ or $r$, measuring the degree of correlation. One correlation coefficient is the Pearson correlation coefficient, which is sensitive only to a linear relationship between two variables (which may exist even if one is a nonlinear function of the other). Other correlation coefficients exist for nonlinear relationships. Mutual information also may be applied to measure dependence between two variables. Returning to the example of the simple Bayesian network X→Y, X and Y are two random variables; X and Y may be said to be correlated if they have a non-zero covariance. X and Y may be said to be causally related if one is the cause and the other is the effect. Random variables that are causally related also will be correlated; however, random variables that are correlated are not necessarily causally related. Extending this example, suppose X is the primary determinant of Y (that is, X is the most important cause of Y). The effect on Y of all other determining factors (which are of secondary importance) may be grouped as E. The relationship between X and Y may be expressed as $$Y = \beta X + \epsilon \quad \text{EQN 4}$$

The value of $\beta$ may be determined by a least-squares estimate. However, this method does not consider any a priori knowledge of the secondary factors. If the sum of all secondary factors is known, a priori, to be zero, the estimation of $\beta$ may be more efficient. To say that the sum $\Sigma\epsilon$ of all secondary factors E is zero is to say that it is known, a priori, that the point X=0, Y=0 lies on the regression line. Thus, to use a variable correlation process to forecast product obsolescence may involve finding two variables X and Y that are correlated with one variable X that is the primary determinant of Y.

Suppose there is a need or desire to find the relationship between obsolescence of microprocessor 251 and some other variable X. X could be one of many variables, and the task to find the "best" of these variables. In the context of microprocessor 251, X could be the cost to manufacture the microprocessor or the speed of the microprocessor relative to current microprocessor speed, transistor density, or original, announced EOL date, for example. Finding the relationship may begin with reference to FIG. 1F and Moore's law.

An early version of Moore's law states that the number of transistors in a dense integrated circuit doubles approximately every two years. The "law" is named after Gordon Moore, co-founder of Fairchild Semiconductor and Intel, whose 1965 paper described a doubling every year in the number of transistors per integrated circuit (e.g., per microprocessor). Of course, Moore's law is an observation and not a physical or natural law, and although Moore's Law generally held steady from 1975 until around 2015, there is no assurance that Moore's law will apply into the future indefinitely.

FIG. 1F illustrates Moore's law applied to actual microprocessors and shows introduction dates for various microprocessors versus the number of on-chip transistors. FIG. 1F is a log-linear graph for the four-decade period beginning in 1971, when semiconductors typically had 2,300 transistors. By 2011, that number increased to 2.6 billion transistors per chip. Although not shown in FIG. 1F, in June 2016, Intel introduced a 22-core Xeon E7 microprocessor with over 5.7 billion transistors.

FIG. 1F suggests that as the number of on-chip transistors increases, the microprocessor's performance increases. While this generally is true, other advances in microprocessor fabrication have added substantially to improved microprocessor performance. Whatever it might suggest about microprocessor improvement, FIG. 1F cannot be said to explicitly relate microprocessor obsolescence to transistor density or for any other fabrication advances. However, FIG. 1F does provide information, if properly interpreted and formatted, that might be useable in an obsolescence forecast. For example, FIG. 1F shows approximate introduction dates for specific microprocessors. This information then may be back-fitted by the correlation module 290, as disclosed herein, to determine LTB information, as appropriate, for certain of microprocessors. The LTB information may be announced LTB information or actual LTB information. The LTB information then may be used to determine if announced LTB dates match actual LTB dates.

Of course, different factors drive the obsolescence of different products and obsolescence forecasting may be tailored to the type of product. For example, successive generations of monolithic flash memory have predictable peak sales years that correlate closely to an increase in size. A plot of this relationship suggests that the number of megabits drives obsolescence. An analysis of these data then may be used to predict when a flash memory unit is likely to become obsolete. For other components, however, the key attribute driving obsolescence may be less clear.

Figure 2I:
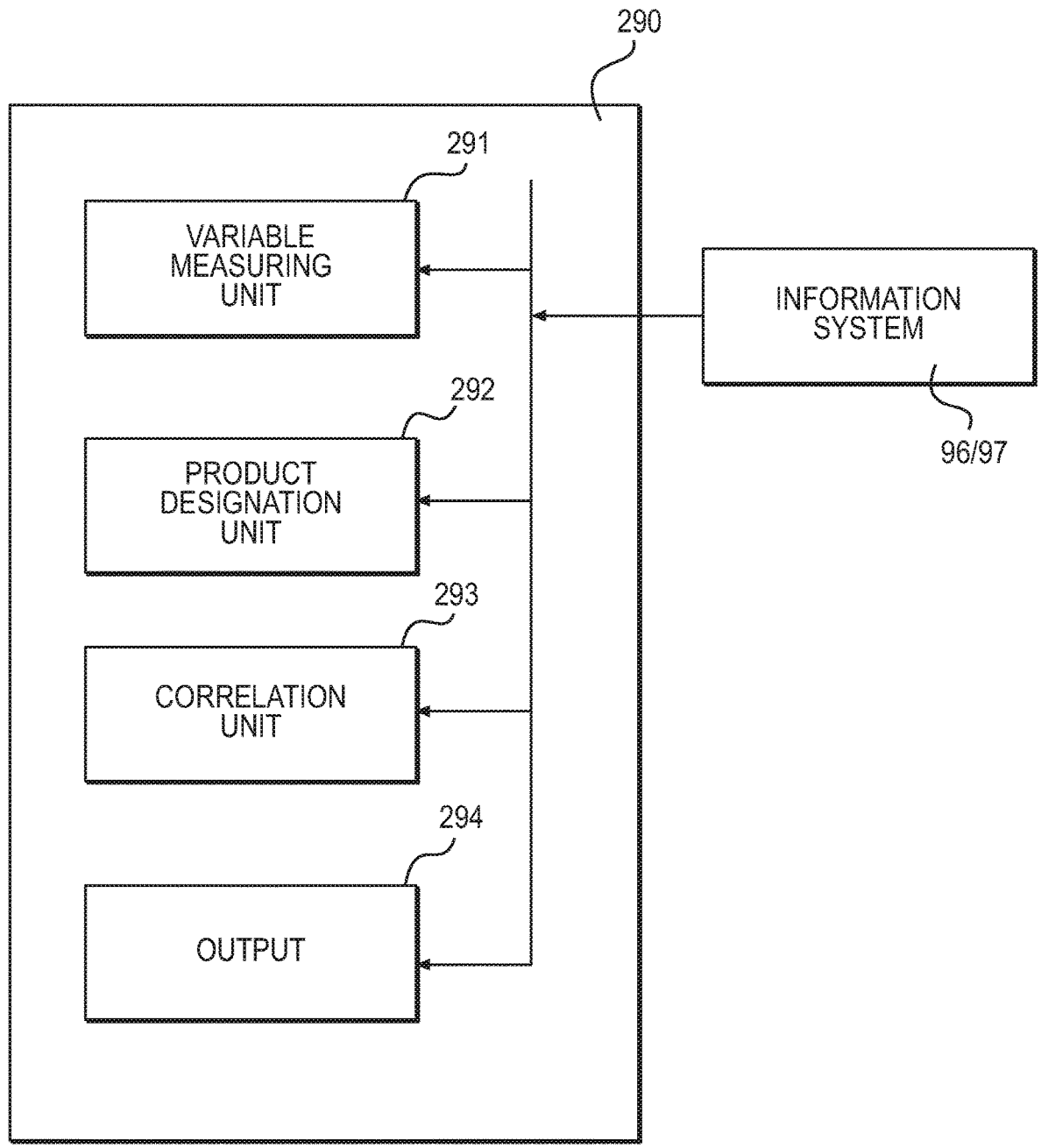

FIG. 2I illustrates optional correlation module 290, which may be incorporated into the product obsolescence forecast system 100, and which may use information such as that explicitly shown in FIG. 1F and information implicit in FIG. 1F. The module 290 may be used in addition to other modules of the system 100, or, as described herein, to replace some functions of certain modules. In an aspect, module 290 may include a variable measuring unit 291 that measures or collects, processes, and analyzes information related to certain features (i.e., a variables) that may be identified or defined for an existing product (the product of interest) that may go obsolete. The unit 291 also may measure variables for products that may be designated as similar to the existing product. For example, the existing product may be a single core microprocessor from manufacturer 30B and the unit 291 may determine the original, announced EOS date and the actual EOS date for other single core microprocessors from manufacturer 30C. The data may be provided, in the system 100, from the systems 96 and 97. A designation unit 292 may perform the designation between the existing product and other products. To perform this designation, the unit 292 may execute a matching or similarity algorithm that compares features of the existing product with features for a number of other products as provided by the systems 96 and 97. For example, the systems 96 and 97 may have available all original, announced EOS dates for all microprocessors of FIG. 1F, core designations, transistor density, manufacturer, year of introduction, and other data. A correlation unit 293 may measure covariance of variables between the variables defined for the existing product and similar products. Output unit 294 provides information from the correlation unit 293 to other components of the system 200. For example, the output unit 294 may provide product correlation information to the BNN 210 of FIG. 2C. In addition to product correlation information, The module 290 may be used to predict or forecast a product going obsolete in different scenarios including (1) when an EOL date is announced for the product and an actual EOL date may precede the announced EOL date, (2) when no announced EOL date is provided for the product, and (3) when the product may go obsolete because of obsolescence of an upstream system or a downstream component.

Considering scenario (1), the correlation module 290 receives information regarding a product (e.g., microprocessor 251) going obsolete. The information may include information derived from an EOL notice, big data information from blogs and Web sites, and other Internet sources related to the microprocessor 251. Assume the information includes a PCN that states an EOL date. A customer (customer 40A) operates an airline with airplanes that include avionics systems that in turn include computers in which the microprocessor 251 is installed. The module 290 then may execute a correlation process (e.g., linear regression) to determine if the actual EOL date may precede the announced EOL date. For example, the announced EOL date may be 12 months after the PCN is published. The module 290 may determine the probability that the actual EOL date will occur in one of the four quarters, or in one of the twelve months, preceding the announced EOL date.

Figure 2J:

FIG. 2J shows an example output data set 201 used by the correlation module 290 of FIG. 2I as well as other components of systems 90 and 100. The data set 201 may include data elements extracted from various data sources, including structured, semi-structured, and unstructured data sources. The data set 201 includes data elements extracted by the system 96 for a number of microprocessors as well as for microprocessor 251. In an aspect, the data elements may be ranked according to a measure of their potential usefulness in producing an accurate obsolescence forecast. The data set 201 may comprise corrected and formatted data elements; the data set 201 may be a data structure of an analyzable nature.

As noted with respect to FIG. 1D, the product management system 90, including the product obsolescence forecast system 100 may forecast product obsolescence (EOL) in a number of scenarios including (1) when a product manufacturer announces an obsolescence date (such as by way of an EOL notice), or (2) when no obsolescence announcement has been made but information and data are available to suggest such an event. In an aspect, the systems 90 and 100 may be used to forecast an obsolescence event based on the intake, formatting, and analysis of multiple data sources, including "big data." FIGS. 2K and 2L illustrate, respectively, embodiments of data collection and processing systems included in the system 90, to produce information for analysis by the system 100.

Figure 2K:
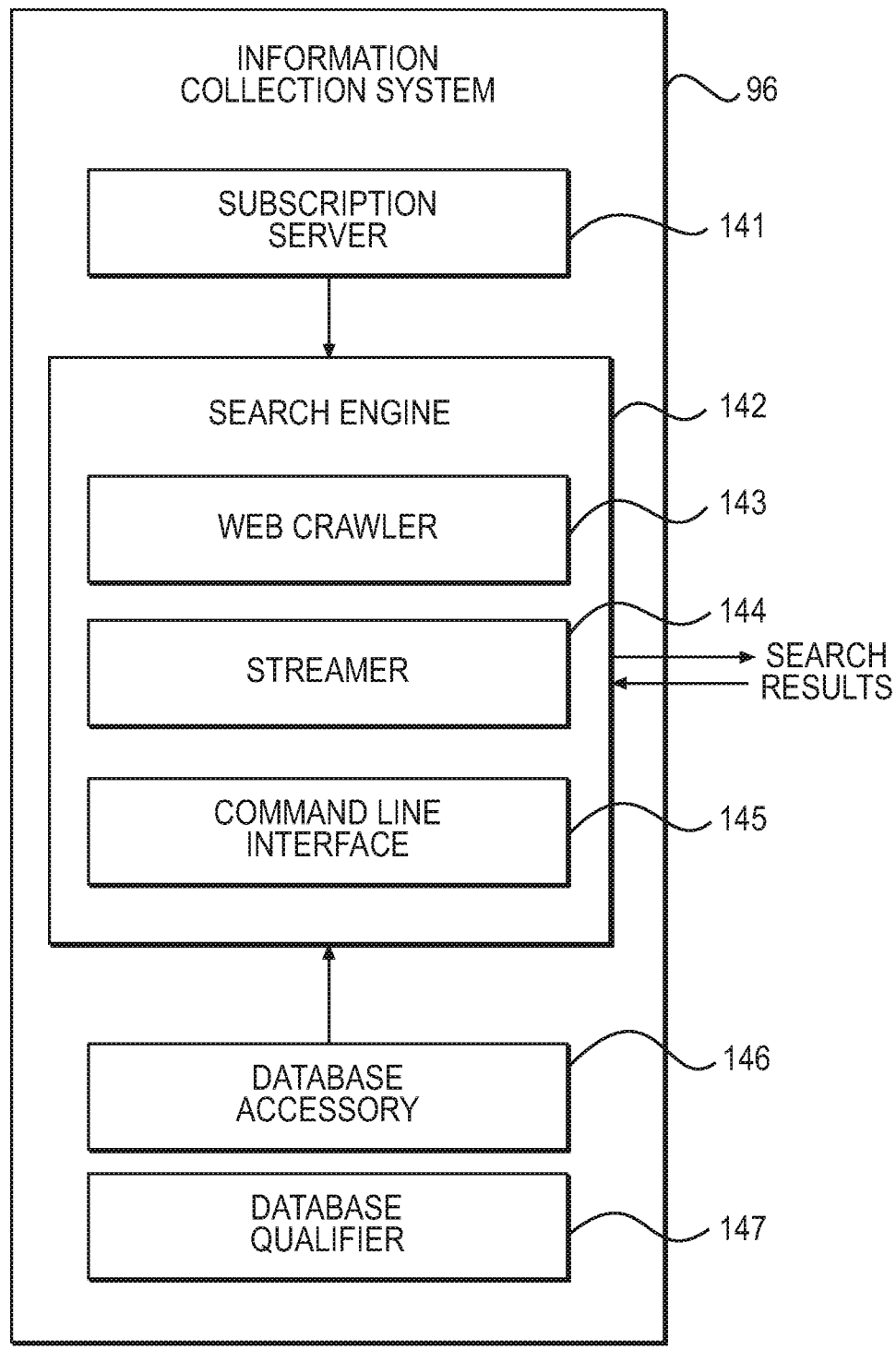
Figure 2L:
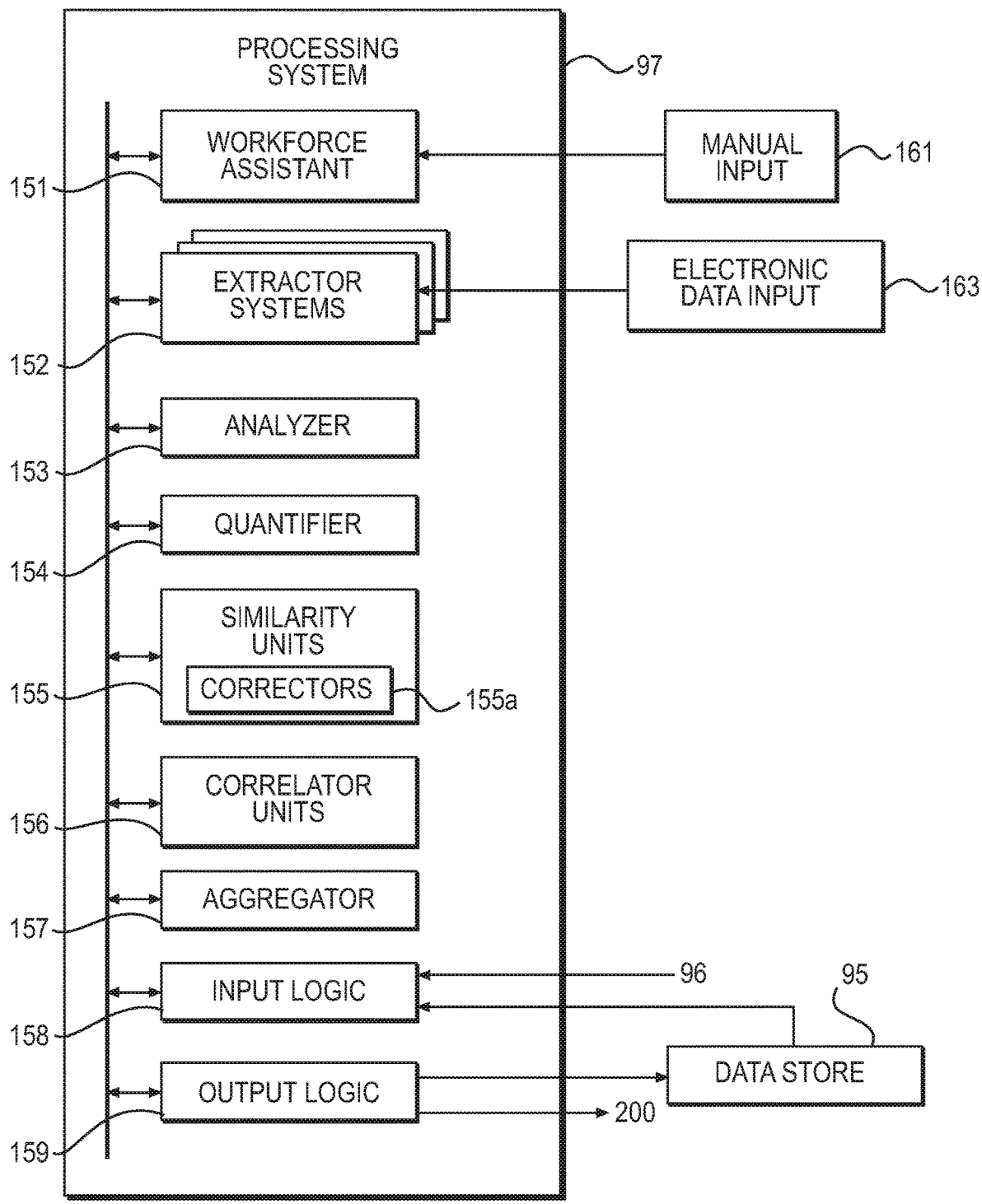

Referring to FIG. 2K, information collection system 96 includes mechanisms to receive push data and to extract pull data. For example, the customer 40A, operating the systems 90 and 100 may use subscription server 141 to receive various notification services such as PCNAlert, which pushes information related to PCNs, and particularly information related to obsolescence. The customer 40A may subscribe to certain services provided by a product manufacturer, including PCNs issued directly by the product manufacturer. The system 96 also may include a search engine 142 that includes associated Web crawler 143. The Web crawler 143 may be configured to search selected online content that is publicly available. The Web crawler 143 may index certain Web sites that provide streaming data sources. The system 96 may include streamer 144 that consumes and processes streaming data. The system 96 also may include a command line interface device 145 that accesses data from structured data sources. The search engine 142 may include, or may cooperate with, a database accessor 146 that performs an initial database access operation and a database qualifier 147 that determines the schema for a searched or accessed database in order to efficiently and accurately access data in the database. One system and method for determining a database schema is disclosed in U.S. Pat. No. 5,522,066, "Interface for Accessing Multiple Records Stored in Different File System Formats," the contents of which are hereby incorporated by reference. Thus, the "big data" collected by the system 96 may be collected and stored using tools specific to characteristics of the big data. For example, institution big data is existing accumulated data, and existing database contents may be accessed and stored using the command line interface device 145. System big data is data collected in real time and that may be stored using the streamer 144. Social big data, including text information and images (static and moving (video)); social big data in any format, such as short sentences (tweets) or news, or a keyword or hashtag may be collected and stored using Web crawler 143.

Although the disclosure refers to standard data definitions, namely structured, semi-structured, and unstructured, in reality, all data may possess some structure. For example, an email contains header information, time and date information in addition to free-form text contained within the body of the email. The same can be said for blogs, comments, and many other electronic documents available over various networks, including the Internet. Thus, search mechanisms (e.g., search engine 142) of the information collection system 96 cooperate to acquire relevant information from appropriate sources, regardless of the data structure. In an aspect, the system 96 scrapes header information (data elements) from blogs, news articles, commentary, and other data items that may reside at, for example, a manufacturer's Web site, to the extent the system 96 search mechanisms (143, 144, 145) are able to access those data items. The search mechanisms may include logic that "learns" network locations that produce the most useful information and may store the locations for future searches. By learning and storing these locations, the information collection system 96 may improve data analyses, including accuracy of the product obsolescence forecast by the system 100. The search mechanisms may originate a search effort or project with an initial set of network locations to search; as the initial network locations are searched, the search mechanisms may identify additional network locations to search; this process may repeat any number of times thereby expanding the search effort.

Besides finding correlations between and among products and product features, the product obsolescence forecast, and secondary analyses may be improved by finding correlations between and among data elements and by using multiple, different types of data elements. In instances where data elements correlate, the obsolescence forecast may be executed using only one of the data elements to avoid biasing the forecast. Still further, certain types of data elements may be analyzed to determine which is or are most important to an accurate obsolescence forecast. The obsolescence forecast then may execute using only the most important types of data element (or only a single, important data element). For example, in reference to FIG. 1F, transistor density may be determined to be most important (i.e., the most reliable variable) for microprocessor obsolescence forecasting. The processing system 97 may include mechanisms that address the above aspects of data element use in obsolescence forecasting.

The processing system 97 receives information and data and performs various processing routines to format the information and data for use in the product obsolescence forecast system 100. FIG. 2L shows the processor system 97. The processor system 97 includes input logic 158 that receives data and information from information collection system 96, and other sources, and may retrieve data from data store 95. Processor system 97 includes workflow assistant 151 that may receive manual inputs from a human operator. The system 97 further includes extractor system 152 (described in more detail with reference to FIG. 2M) that identifies data elements within a data item, analyzers 153 that determine the relevance of the data elements in the context of the data item and consequent relevance of the data element and the data item to the product in question (e.g., the microprocessor 251), and quantifiers 154 that determine any applicable importance and/or weighting to apply to the data elements and the data item. The system 97 still further includes similarity units 155 that generate similarity mechanisms that may be used to evaluate the similarity of products that may be in the same class of products as semiconductor 251 and to use "similar products" for use in the obsolescence forecast. In an aspect, the similarity units 155 also may determine if a particular synonym might be equivalent to the data item. In another aspect, the similarity units 155 may identify products that are similar to the product in question. In a further aspect, the similarity units 155 may generate a similarity matrix for one or more products and corresponding data items, data elements in those data items, and values of the data elements, where the similarity matrix includes identities of similar products, synonyms, and other entries. In an aspect, the similarity units 155 may include data element and data item correctors 155*a* that may make adjustments and corrections to the data elements and data items (e.g., correcting misspelled data elements and data items, making data elements and data items consistent with other data elements and data items). Yet further, the system 97 may include correlator units 156 that determine correlations between or among data elements derived from a data item; in an aspect, the correlation unit 156 may indicate data elements that are repetitive and/or are not independent such that their use may bias the obsolescence forecast. Further still, the system 97 includes aggregators 157 that group data elements, including grouping correlated data elements.

By an iterative operation, the systems 96 and 97 cooperate to produce an accurate database (e.g., data set 201) of data elements and data items that may be used to (1) train various probability mechanisms such as the Bayesian Neural Network 210 of FIG. 2C and the optional correlator 290 of FIG. 2I, (2) verify training, and (3) provide information of an analyzable form for use by other components of the product obsolescence forecast system 200. The accurate database may reside in the data store 95 or may be stored in the cluster 50, for example, in the customer data repository 52A. The database is accurate in the sense that the data items and data elements in the database are relevant and that all data elements in the data item are identified, extracted, and processed.

Figure 2M:
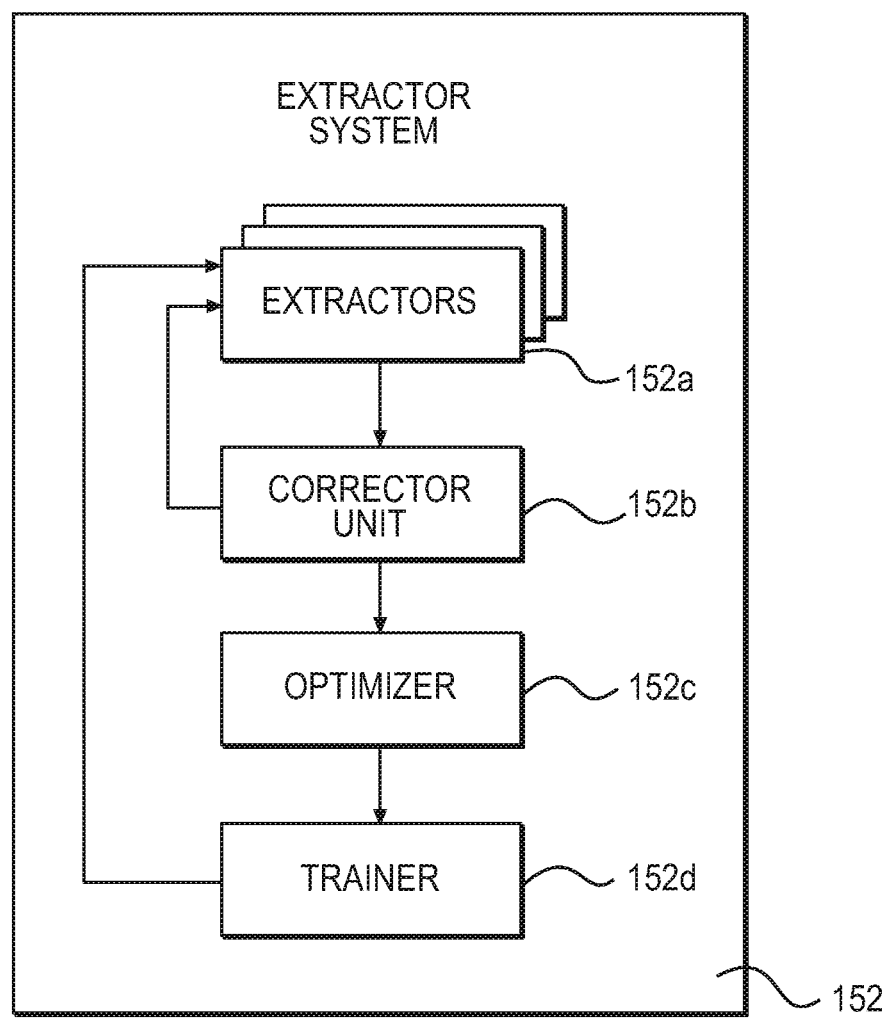

In an aspect, to begin operation of the system 97, the workflow assistant 151 allows a human user to operate a manual input interface 161 to specify data elements, data items, and other information to operate the system 97. In another aspect, extractor system 152 receives a scan or other electronic input 163 of data elements and/or a data item, or a command to access data store 95 and selects data elements from the data item. FIG. 2M shows the extractor system 152 in more detail. In FIG. 2M, extractor system 152 includes multiple extractors 152*a*, some of which may be pre-defined to suit the product in question. Alternately, some or all extractors 152*a* may be trained using a training data set, or may be trained on the fly—that is, trained on actual data with metrics to determine the goodness of the training. The extractors 152*a* may include a wildcard feature to expand the set of data elements. The extraction system 152 further includes corrector unit 152*b* that cooperates with the extractors 152*a* to make corrections to data elements. When the correction unit 152*b* corrects a data element, the prior and corrected data elements may be stored and/or self-referenced. The extractor system 152 further includes optimizer 152*c* that may be used to tune and refine the precision and recall of data element extraction by the extractors 152*a* (which is separate and distinct from training the extractors 152*a*). For example, the optimizer 152*c* may execute various algorithms that recognize differences between and among a base word (i.e., a data element) and variations of the word (singular/plural, formal/colloquial) use of similes, hyperboles, alternate spelling, etc. In an aspect, the optimizer 152*c* may incorporate an electronic catalog of data elements and possible variations and alternate expressions, and a taxonomy of technical terms appropriate for the information source(s). Extractor system 152 includes trainer 152*d*, which may be used to train and test extractors 152*a* against a sample of the target data. For example, when a text including a related keyword is searched by Web crawler 143, product obsolescence information may be generated such that a data table may show the number of occurrences of each keyword. In such a case, the searched texts are raw (and unstructured) data that correspond to product obsolescence features before any processing by the processing system 97. Furthermore, the data table may include the number of times a text occurred for each keyword. As another example, information from an EOL notification (e.g., in a PCN) may be abstracted or extracted from the actual PCN, formatted, stored in database (data store 95), and the database may be accessed by the filtered input logic, which reads a product name and announced EOL data for an existing product, such as a product Q and/or a product R.

Figure 3A:
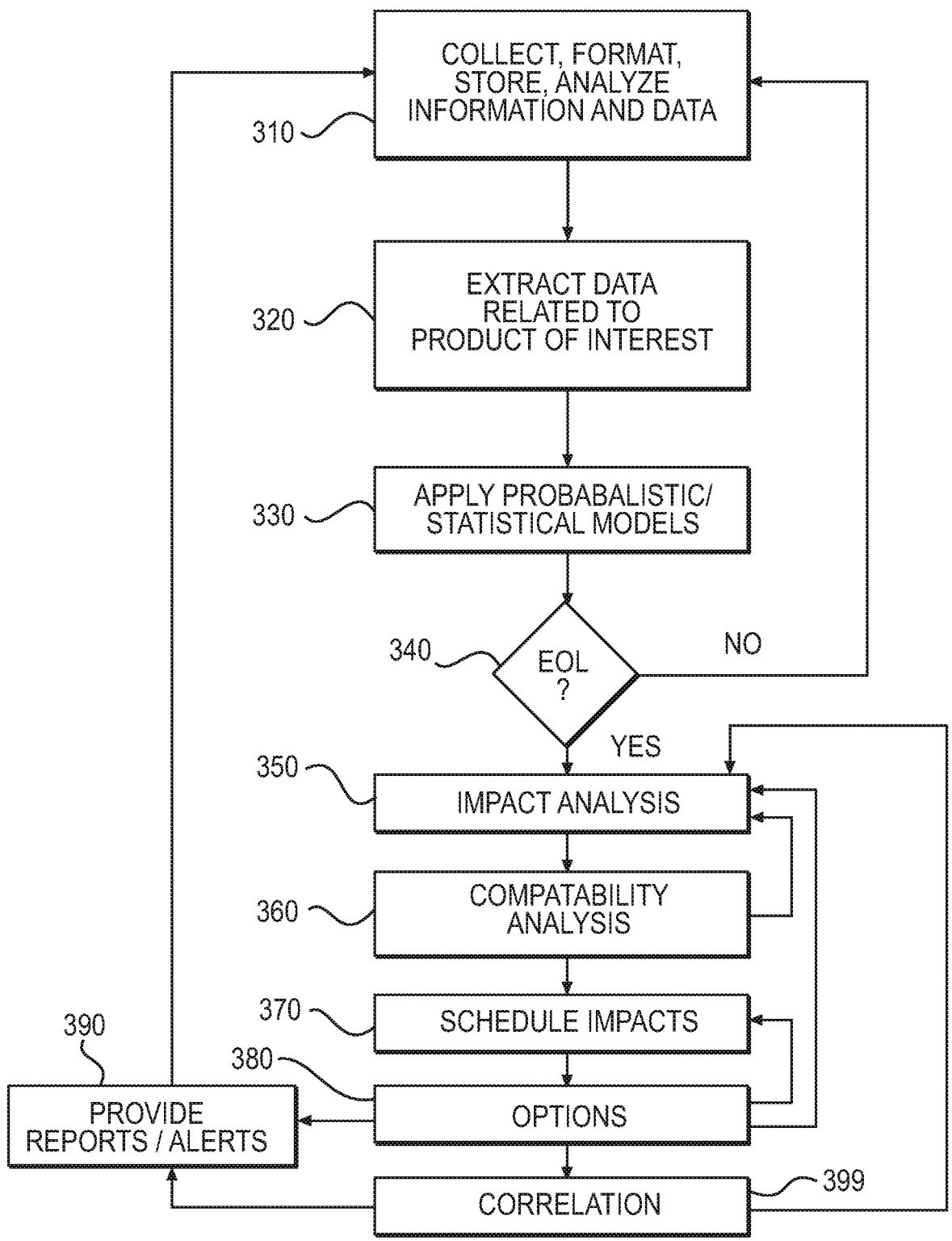

FIGS. 3A-3I are flowcharts illustrating example methods for forecasting product obsolescence and assessing the impact of a forecast obsolescence (i.e., an early EOL) using the systems 90 and 100, and other systems and components, of FIG. 1A, or, alternatively, system 190 of FIG. 1H, as well as the systems and components of FIGS. 2A-2M. In general, the methods of FIGS. 3A-3I are disclosed in connection to a hypothetical scenario wherein semiconductor 251 may "go obsolete" as processed by the systems of FIGS. 1A, 1H, and 2A-2M. Referring to FIG. 3A, product obsolescence forecast method 300 begins in block 310 when processors in the systems 90 and 100 of FIG. 1A execute instructions to collect data from various sources, including source 70, format the collected data, store the formatted data, and perform various analyses on the stored, formatted data. The processes of block 310 are described in more detail with respect to FIGS. 3B(1) and 3B(2). Following block 310, the method 300 moves to block 320.

In block 320, the processors extract data and information for microprocessor 251 for which a forecast of product obsolescence is desired. The processes of block 320 are described in more detail with respect to FIG. 3C. Following block 320, the method 300 moves to block 330, where the processors apply probabilistic and statistical models to data related to microprocessor 251 and the stored, formatted data. Following block 330, the method 300 moves to block 340, where the processors determine if, for the microprocessor 251, an EOL may be forecast that predates an announced EOL date for the same microprocessor 251, or, when no announced EOL date is available, an EOL date is established within a specified time frame, such as, for example, within the next 12 months. The EOL forecast may be provided with a specified confidence interval. The processes of blocks 330 and 340 are described in more detail with respect to FIG. 3D. Following block 340, if an EOL forecast date with a specified confidence interval was produced, the method 300 moves to blocks 350, 360, 370, 380, 390, and optionally block 399 to execute various secondary analyses and provide related reports and alerts. Otherwise, the method 300 returns to block 310.

The remaining blocks of method 300 involve secondary analyses and reports and alerts based on the forecast EOL date. In block 350, the processors perform various analyses to determine the impact of microprocessor 251 EOL; in block 360, the processors perform various analyses to determine compatibility of products that may be used in lieu of the microprocessor 251; in block 370, the processors perform various analyses to determine scheduling impacts; and in block 380 the processors perform various option analyses. Note that the operations of blocks 350 and 360 may involve a looping process until required conditions are satisfied. Similarly, the operations of blocks 370 and 380 may involve a looping process until required conditions are satisfied. Finally, blocks 350-380 may involve a looping process in which, following block 380, method 300 returns to block 350, until required conditions are met. Specific methods executed during blocks 350, 360, 370, and 380 are described with respect to FIGS. 3E, 3F, 3G, and 3H, respectively. Following block 380, the method 300 moves either to block 390 or to optional block 399.

In block 390, the processors provide various reports, alerts, and notifications. Following block 390, the method 300 returns to block 310. Optional block 399 is directed to an optional correlation method. Example methods of block 399 are disclosed with respect to FIG. 3I. Following optional block 399, the method 300 returns to block 350 to repeat, as necessary, aspects of block 360-380. Once required re-execution of blocks 350-380, the method 300 moves to block 390.

FIG. 3B(1) illustrates in more detail the processes of block 310 (i.e., method 310a) related to the collection, processing, and formatting of information and data used to forecast obsolescence of microprocessor 251, and to perform various secondary analyses. In an embodiment, method 310a uses components of the systems illustrated in FIGS. 2K-2M. Method 310a begins in block 311 when the information collection system 96 using database accessor 146 (FIG. 2K) accesses information related to product obsolescence forecasting, product configuration, related system and component information including system availability and schedule information, component and system compatibility information, and other information and data. The accessed data and information may include structured, semi-structured, and unstructured data. The accessed data and information may include data and information from big data sources and thus may constitute "big data." The unstructured data and information may include text and images. The semi-structured data may include posts, blogs, notices, emails, and similar data items. The structured data may include data from traditional databases or data structures using known database schemas such as relational databases. In some instances, the schema of the data or information source may be known by the system 96. In other instances, the schema is not known by the system 96, and in those instances, as part of the processes of block 310, the database qualifier 147 (FIG. 2K) executes to determine the database schema. Actual search of the data and information sources may be executed in block 312, using search engine 142, and more particularly Web crawler 143 and command line interface 145. The Web crawler 143 may search specific, known Web sites and may expand the list of Web sites based on results of information retrieved from the known Web sites. The search engine 142 may use command line interface 145 to search known databases. In addition to searching data and information sources, the subscription server 141 may receive push data and the streamer 144 may receive product monitoring data in real time or near real time where such data is obtained from the product of interest and is available to the system 96. In block 313, where the system 96 identifies information and data relevant to, or possibly relevant to, the product of interest (i.e., the microprocessor 251), the search engine 142 obtains the information and data and passes the information and data to the processing system 97 along with information and data from the subscription server 141. Following block 313, the method 310a moves to block 314 and components of the system 97 of FIG. 2L extract data elements from data items provided through the system 96, format the data elements, and store the formatted data elements for further processing and analysis. For example, the system 97 components may extract EOL dates, manufacturer names, product descriptions and designations, and product characteristics (data elements), format the extracted data elements and store the formatted data elements. Following the process of block 314, the method 310a moves to block 315 and components of the system 97 analyze and quantify the data items, define similar data elements and correlate the data elements where appropriate, and perform any appropriate aggregations to produce analyzable data of a form and format that may be efficiently and accurately analyzed in an obsolescence forecast process and in secondary analysis processes. FIG. 3B(2) provides additional description of the block 314 extraction process. Following block 315, the method 310a moves to block 316 where the analyzable data is stored in an analyzable data structure (see data set 201, FIG. 2J) for evaluation and analysis by the analytical components of the obsolescence forecast system 200.

FIG. 3B(2) is a flowchart illustrating data element extraction method 310b. Method 310b begins in block 317 when one or more trained extractors 152a is applied to a set of data items collected by search engine 142 to identify data elements for analysis by the obsolescence forecast system 200. The extractors 152a identify potentially relevant data elements in the collected data items. The extractors 152a may save the extracted data elements in, for example, data store 95. Following extraction and storage of the data elements, the method 310b moves to block 318 and the corrector unit 152b, in cooperation with the extractors 152a, makes appropriate corrections to the stored data elements. When the correction unit 152b corrects a data element, the prior and corrected data elements may be stored and/or self-referenced in the data set. Following block 318, method 310b moves to block 319 and optimizer 152c executes to tune the extractors 152a based on the stored data elements. Following block 319, method 310b ends.

Figure 3C:
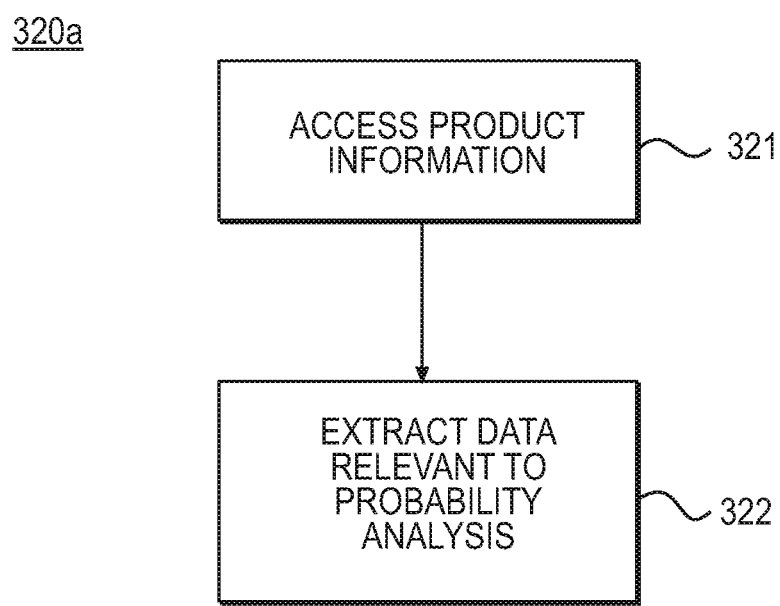

FIG. 3C is a flowchart illustrating the process of block 320 (method 320a) in which processors of the systems 90/96 access data and information for microprocessor 251 and for which a forecast of product obsolescence is desired. In block 321, the system accesses information provided by customer 40A, information related to microprocessor 251 contained in data set 201, and information contained in other data sources. In an aspect, the information may include data elements that correspond to data elements for similar products. For example, a data element, transistor density, may have been extracted for similar products; thus, the system 96 would extract transistor density for semiconductor 251. In block 322, the system 96 accesses the data sources and retrieves the data elements, and stores the data elements in data store 201. The processes of blocks 310 and 320 may execute in an iterative fashion as data elements are extracted for the semiconductor 251 and other semiconductors of the same class as the semiconductor 251.

Figure 3D:
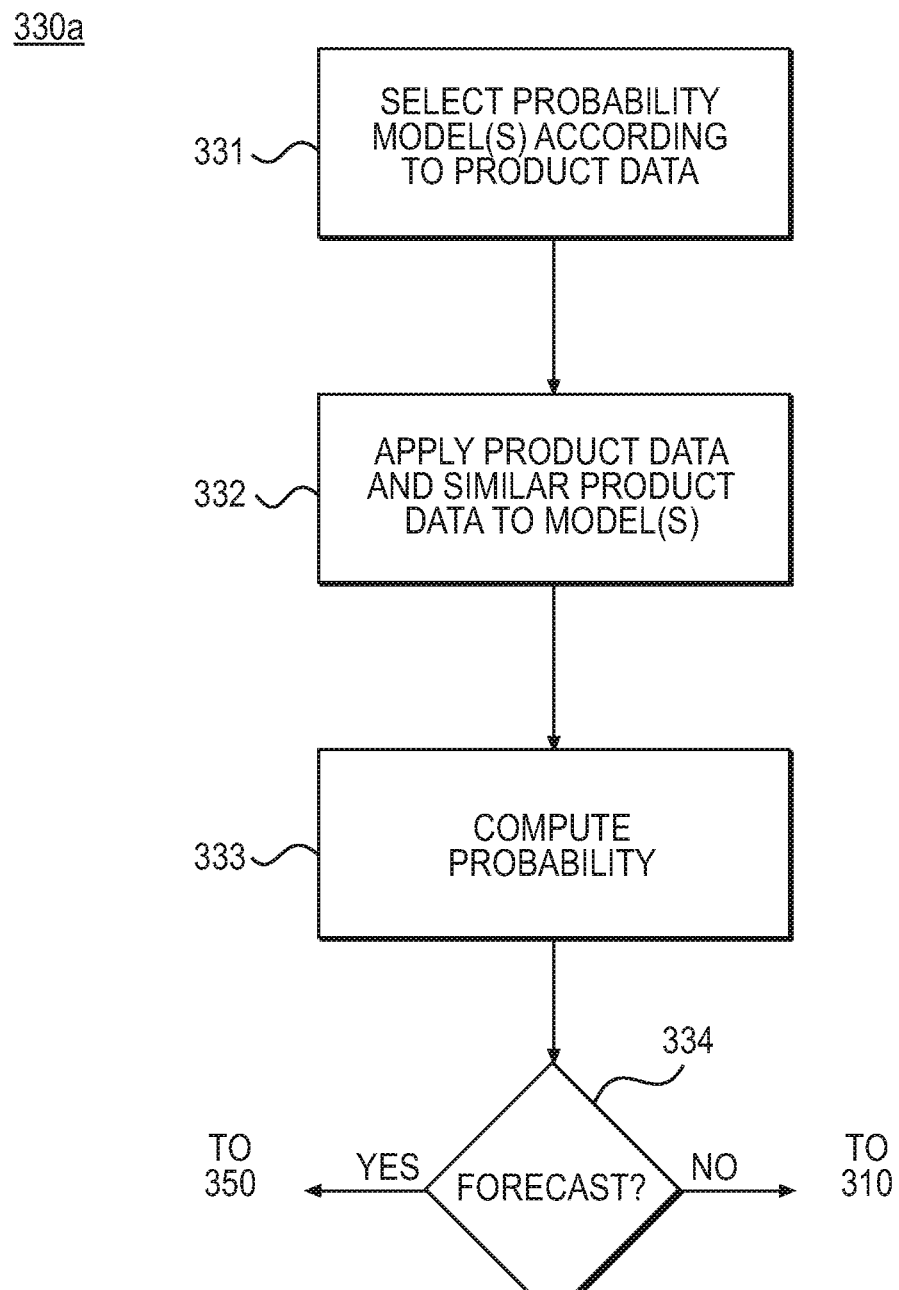

FIG. 3D illustrates in more detail the processes of blocks 330 and 340 (i.e., method 330a) related to obsolescence forecasting by the obsolescence forecast system 200 of FIG. 2B. Method 330a executes to determine if it is possible, with an appropriate level of confidence, to forecast an early EOL (namely, an EOL that may occur before an original, announced EOL, or, in the absence of an original, announced EOL, a EOL that may occur within a specified time such as within the next twelve months). Method 330a begins in block 331 when an appropriate probability model is selected to determine probability of an early EOS. In an aspect, the system 200 may apply one or several probability models. One such model is the BNN 210. To execute the BNN 210, some prior data must be available to compute prior probabilities. Thus, the system 200 must have access to data appropriate for any selected probability models. Assuming such data are available for the BNN 210, method 330a moves to block 332 and the BNN 210 receives information related to the product of interest (i.e., the microprocessor 251). In block 333, the BNN 210 computes the appropriate prior probabilities to compute the desired conditional probability using, for example, EQN. 3. In block 334, the system 200 determines if execution of the BNN 210 produced an acceptable EOL forecast. In such a forecast is not produced, method 330a returns to block 310. Otherwise, method 330a moves to block 350.

Figure 3E:
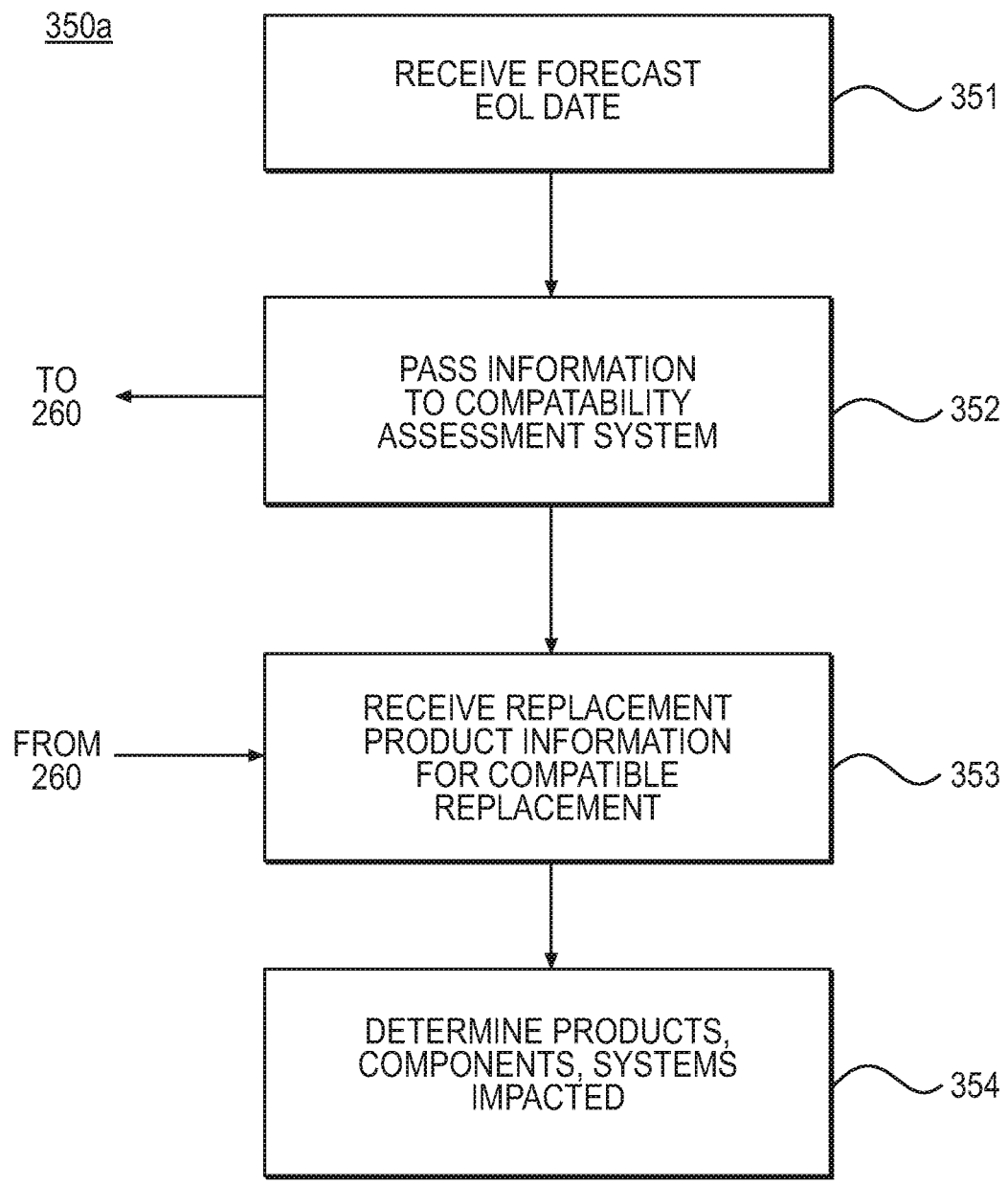

FIG. 3E illustrates in more detail the processes of block 350 (i.e., method 350a) related to analyzing the impact of an early forecast EOL. In block 351 of the impact analysis method 350a the system 230 receives a forecast EOL date that predates an original, announced EOL date for microprocessor 251. in block 352, the system 230 passes information related to the microprocessor 251 to system 260 (see block 363 of FIG. 3F) that determines possible replacements for products and components, as shown, for example, in the network of FIG. 2E, that may be affected by the forecast EOL. In block 353, the system 230 receives replacement product information. In block 354 of method 350a, the system 230 determines which of the component and products may require replacements, and which of the systems are directly or indirectly impacted by the forecast EOL.

Figure 3F:
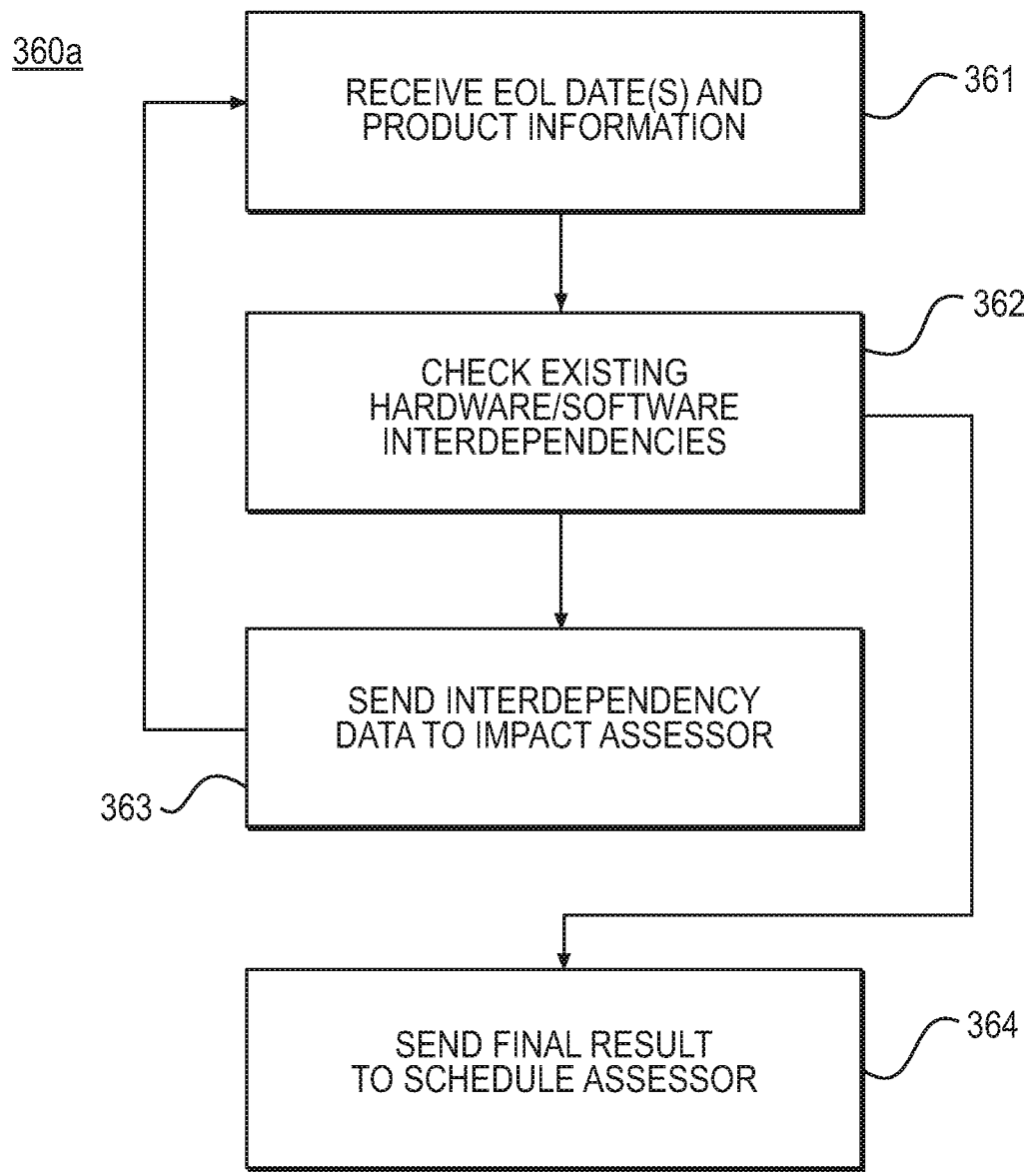

FIG. 3F is a flowchart that illustrates in more detail the processes of block 360 (i.e., method 360a) related to assessing compatibility of product replacement, substitution, or continued use in view of an early forecast EOL. Using the microprocessor EOL example from above, method 360a begins in block 361 when the input logic 262 receives EOL dates and other information related to microprocessor 251 and passes the microprocessor information to the network mapper 264 and compatibility logic 264. In block 362 the logic 264 checks the existing hardware and software interdependency network map 250 (see FIG. 2E) and finds that the microprocessor 251 directly affects operation of processors 252, 253, and 255. Processors 253 and 255 in turn communicate with system 254, which includes a processor that has an unsupported software version. The processors with replacement microprocessors must be able to communicate with a processor in avionics system 254, which means that processor in avionics system 254 also must be given an updated microprocessor. In block 363, the output logic 268 sends the information of the microprocessor 251 and the affected processor of avionics system 254 to the impact assessment module 230 to determine impacts associated with the microprocessor replacements. The module 230 then sends the impacts back to the compatibility module 260 to check compatibility of the replacement microprocessors based on new impacts. The processes of blocks 361 and 362 repeats and then, in block 364, the compatibility module 260 sends the results to the schedule analysis module 270, where airplane schedules are checked based on the microprocessor EOL dates.

Figure 3G:
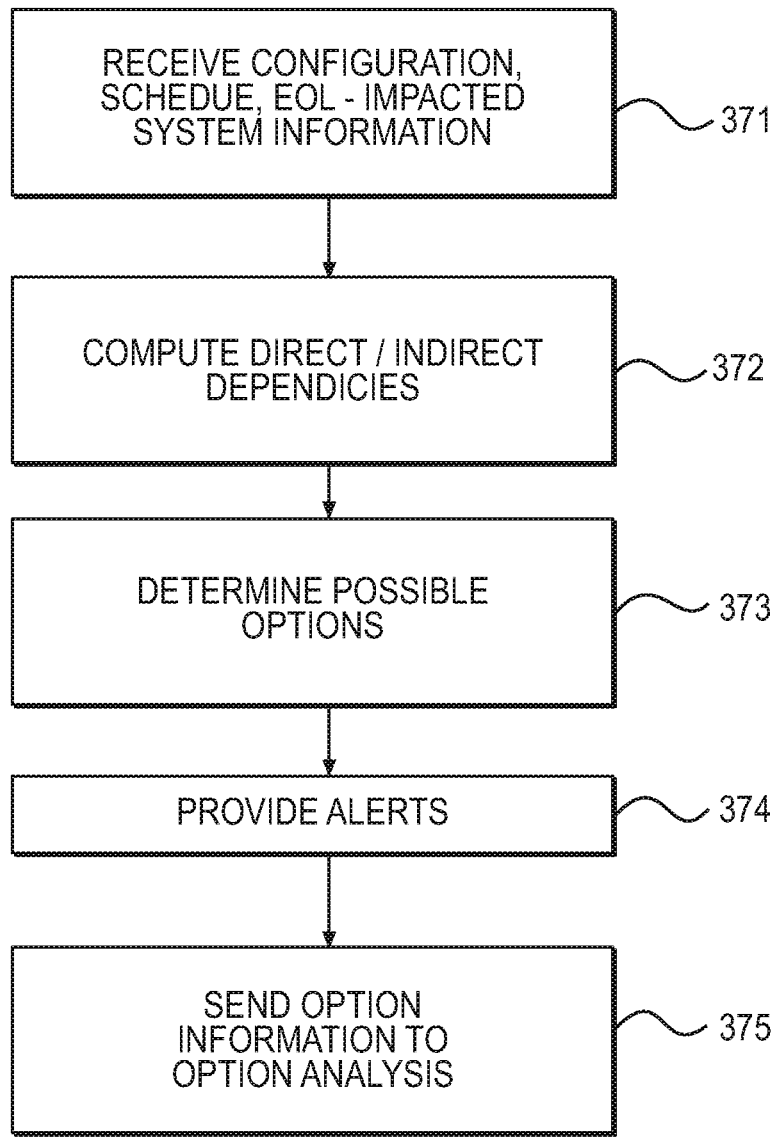

FIG. 3G is a flowchart that illustrates in more detail the processes of block 370 (i.e., method 370a) related to assessing system schedules for replacing, where necessary, a product that is forecast to go obsolete by comparing planned product replacements with known EOL information to determine an optimal product replacement schedule considering schedule impacts on systems receiving replacement products. Method 370a begins in block 371 when the input logic 271 receives as inputs system configuration information, system schedule information, and EOL impacted systems, products, and components information. In block 371, the input logic 271 further receives historical cost information and existing cost information for product replacement. The system configuration information may include information from a database of product versions and the metadata, status, and direct dependencies for each product version (see FIG. 2E). In block 372, the schedule analysis logic 272 computes direct and indirect dependencies for a given product considering scheduling and availability information, and computes the consequences of upgrading the given product from the network map (e.g., network map 250 of FIG. 2E). In block 373, using the system configuration, schedule, EOL alerts and cost information, the schedule analysis logic 272 determines possible options for replacing or sustaining the EOL product. The options include (1) a bulk buy for sustainment of an EOL product (i.e., a product going obsolete) before the announced or forecast EOL, (2) a complete requalification and replacement of the EOL product, and (3) when no new products for replacement are available before EOL, a replacement of the EOL product using the removed equipment to support the remaining installed EOL products until all can be replaced with new products. Other options may be possible. In block 374, the schedule analysis logic 272 may provide a suggested action derived from one of these options using either a necessity requirement or a most cost effective requirement. In block 375, the system 370 sends the option information to the option analysis unit 280.

Figure 3H:
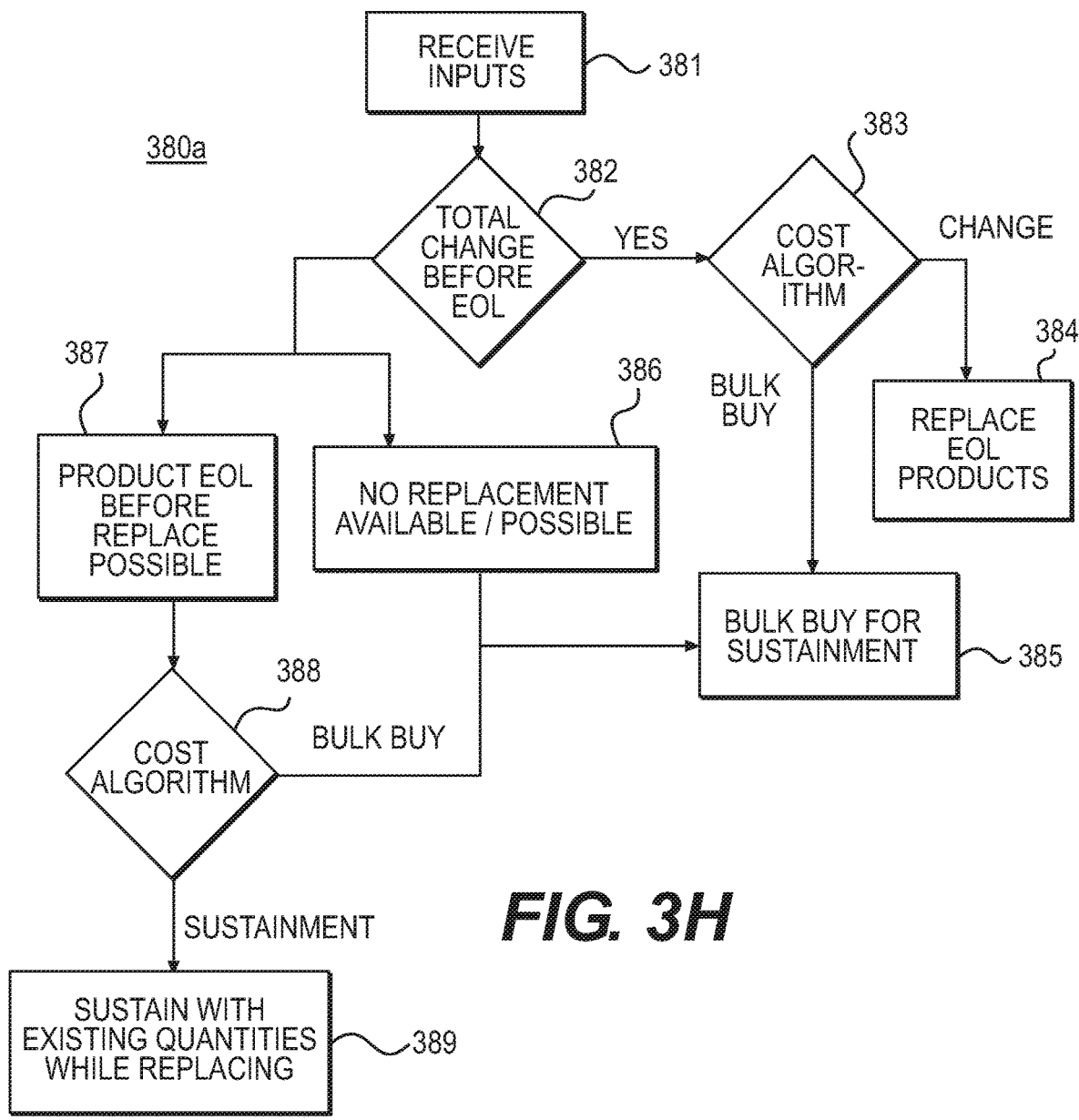

FIG. 3H is a flowchart illustrating operation of option analysis unit 280. In FIG. 3G, option analysis unit 280 includes algorithm 380a that may be executed by processor 121 (FIG. 2B). Algorithm 380a begins with inputs at block 381 from input logic 271. At block 382, using the inputs from block 381, the algorithm 380a determines if total replacement of EOL products is possible before an announced EOL and/or a forecast EOL. If total replacement is possible, the algorithm 380a moves to block 383, which is a cost algorithm, where a determination is made of the cost of total product replacement versus bulk buy from existing stocks of the product for sustainment. If total product replacement is the least expensive option, in block 384, the algorithm 380a makes a total product replacement suggestion (option 2), and if bulk buy for sustainment is the least expensive option, in block 385, the algorithm 380a makes a bulk buy for sustainment suggestion (option 1).

Returning to block 382, if total product replacement before EOL is not possible, the algorithm 380a moves to blocks 386 and 387; in block 386, the algorithm 380a determines if partial product replacement before EOL is not possible (e.g., no replacement products are available). Following block 386, the algorithm 380a returns to block 385. In block 387, the algorithm 380a determines that at least partial procurement of replacement products is possible before EOL. Following block 387, the algorithm 380a moves to block 388 to execute the cost algorithm to determine if bulk buy from existing stocks of the products is less expensive than product sustainment from existing stocks of the product while replacing the product with new products (option 3). If option 3 is less expensive, in block 389, the algorithm 380a makes this recommendation. At certain points of method 380a (blocks 384 and 385) of method 380a, the executing logic may return processing to block 370 to re-determine, if necessary, schedule impacts. In addition, logic of blocks 384, 385, and 389 may return results and processing to block 350 to re-determine impacts.

Figure 3I:
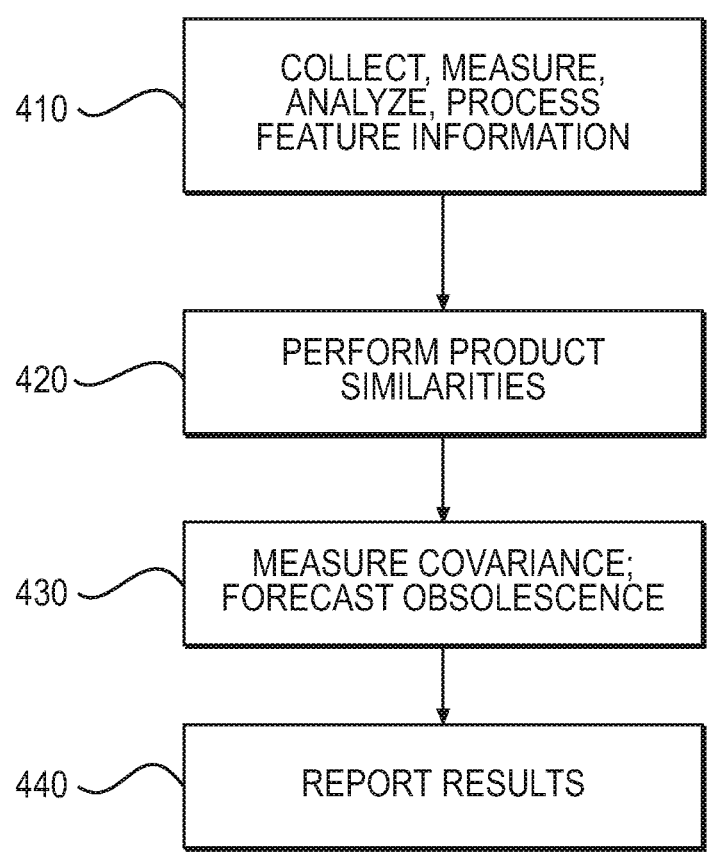
FIG. 3I is a flowchart illustrating an optional method executed by the systems of FIG. 2I.

FIG. 3I illustrates the processes of block 400, specifically, method 400a, which is executed through optional correlation module 290, which may be incorporated into the product obsolescence forecast system 100, and which may use information such as that explicitly shown in FIG. 1F and information implicit in FIG. 1F. In block 410, variable measuring unit 291 measures or collects, processes, and analyzes information related to certain features (i.e., a variables) that may be identified or defined for an existing product (the product of interest) that may go obsolete. In block 410, the unit 291 also may measure variables for products that may be designated as similar to the existing product. For example, the existing product may be a single core microprocessor from manufacturer 30B and the unit 291 may determine the original, announced EOS date and the actual EOS date for other single core microprocessors from manufacturer 30C. The data may be provided, in the system 100, from the systems 96 and 97. In block 420, designation unit 292 may perform the designation between the existing product and other products. To perform this designation, the unit 292 may execute a matching or similarity algorithm that compares features of the existing product with features for a number of other products as provided by the systems 96 and 97. For example, the systems 96 and 97 may have available all original, announced EOS dates for all microprocessors of FIG. 1F, core designations, transistor density, manufacturer, year of introduction, and other data. In block 430, correlation unit 293 may measure covariance of variables between the variables defined for the existing product and similar products. In addition, in block 430, the correlation unit 293 may forecast a product going obsolete in different scenarios including (1) when an EOL date is announced for the product and an actual EOL date may precede the announced EOL date, (2) when no announced EOL date is provided for the product, and (3) when the product may go obsolete because of obsolescence of an upstream system or a downstream component. Considering scenario (1), the correlation module 290 receives information regarding a product (e.g., microprocessor 251) going obsolete. The information may include information derived from an EOL notice, big data information from blogs and Web sites, and other Internet sources related to the microprocessor 251. The information includes a PCN that states an EOL date. A customer (customer 40A) operates an airline with airplanes that include avionics systems that in turn include computers in which the microprocessor 251 is installed. The correlation unit 293 then may execute a correlation process (e.g., linear regression) to determine if the actual EOL date may precede the announced EOL date. For example, the announced EOL date may be 12 months after the PCN is published. The correlation unit then may determine the probability that the actual EOL date will occur in one of the four quarters, or in one of the twelve months, preceding the announced EOL date. Following block 430, method 400a moves to block 440 and the module 290 provides an output of the forecast EOL date and other information. Some output information may be provided to other components of the systems 90 and 100, and other networked systems.

Certain of the devices shown in FIGS. 1A-2M include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flowcharts and accompanying descriptions to illustrate the embodiments represented in FIGS. 3A-3I. The disclosed devices, components, and systems contemplate using or implementing any suitable technique for performing the steps illustrated. Thus, FIGS. 3A-3I are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs; i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A product obsolescence forecast system comprising machine instructions stored in a non-transitory computer readable storage medium, the machine instructions, when executed, causing a processor to:
   receive an identity of a first product and identities of one or more second products similar to the first product, each of the second products having gone obsolete;
   receive a determinant of obsolescence of one or more of the obsolete second products, comprising:
      extracting from a database of data records related to the second products, a plurality of second product data elements,
      generating a second product data element similarity matrix for each of the second products using each of the extracted second product data elements, and
      selecting as one or more determinants, second product data elements from the second product data element similarity matrix;
   generate one or more observations related to the first product by inputting each received determinant to a trained Bayesian neural network, the observations comprising forecast obsolescence dates for the first product; and
   generate a statistical analysis of the one or more observations to provide an expected value of an actual obsolescence date for the first product.

2. The product obsolescence forecast system of claim 1, wherein the processor corrects and formats one or more of the extracted data elements, comprising the processor:
   correcting spelling errors or other errors in the data;
   expanding abbreviations; and
   converting slang and manufacturer-specific names to a consistent taxonomy for products of a class of the first and second products.

3. The product obsolescence forecast system of claim 1 wherein from the second product data element similarity matrix, the processor identifies multiple determinants of obsolescence, each of the multiple determinants applicable to all of the second products.

4. The product obsolescence forecast system of claim 1 wherein from the second product data element similarity matrix, the processor identifies multiple different determinants of obsolescence, one determinant for each of the second products.

5. The product obsolescence forecast system of claim 1 wherein from the second product data element similarity matrix, the processor identifies a singular primary determinant of obsolescence applicable to all of the second products.

6. The product obsolescence forecast system of claim 5, wherein to identify the singular primary determinant of obsolescence applicable to all of the second products, the processor, for each of the extracted data elements for each of the second products:
   applies each data element to the trained Bayesian neural network to generate an observation comprising a predicted obsolescence date for one of the second products;
   based on the observation, determines an accuracy in predicting an actual obsolescence date for a second product;

ranks each of the extracted data elements of the second products in terms a prediction accuracy of each of the extracted data elements; and identifies the singular primary determinant based on the ranking, comprising selecting as the singular primary determinant, data element having a highest prediction accuracy.

7. The product obsolescence forecast system of claim 1, wherein the processor identifies second products similar to the first product by:

extracting, formatting, and correcting first product data elements from one or more first product data records;

generating a combined first and second product similarity matrix comprising the second product data elements and the first product data elements; and identifying from the first and second product similarity matrix, second products having one or more second product data elements identical to a first product data element.

8. The product obsolescence forecast system of claim 1, wherein to generate the statistical analysis, the processor computes an average of the observations.

9. A system for forecasting an obsolescence date of a product, comprising:

machine instructions stored in a non-transitory computer readable storage medium; and a processor, wherein the processor executes the machine instructions to:

generate a product similarity matrix, comprising:
identifying data records related to each of a plurality of products, the products including a first product and one or more second products;
extracting first data elements for the first data product and second data elements for each of the one or more second products; and
arranging the first data elements and the second data elements based on data element type, generate obsolescence determinants from using the second data elements, comprising:
generating observations by applying one or more of the second data elements to a trained Bayesian neural network, the observations comprising forecast obsolescence dates for the second products; and
designating one or more determinants based on the observations, and generate at least one observation related to the first product using one or more of the designated determinants and inputting the determinants to the trained neural network.

10. The system of claim 9, wherein the processor executes the machine instructions to:

generate a plurality of observations related to the first products; and generate a statistical analysis of the plurality of observations.

11. The system of claim 10, wherein the processor executes the machine instructions to retain in the product similarity matrix, second products having one or more second product data elements identical to a first product data element.

12. A product obsolescence forecast method, comprising:

a processor receiving an identity of a first product and identities of one or more second products similar to the first product, each of the second products having gone obsolete, comprising:

extracting from a database of data records related to the second products, a plurality of second product data elements, generating a second product data element similarity matrix for each of the second products using each of the extracted second product data elements, and selecting as one or more determinants, second product data elements from the second product data element similarity matrix;

receiving a determinant of obsolescence of one or more of the obsolete second products;

generating one or more observations related to the first product by inputting each received determinant to a trained Bayesian neural network, the observations comprising forecast obsolescence dates for the first product; and generating a statistical analysis of the one or more observations to provide an expected value of an actual obsolescence date for the first product.

13. The product obsolescence forecast method of claim 12, wherein the processor corrects and formats one or more of the extracted data elements, comprising the processor:

correcting spelling errors or other errors in the data;

expanding abbreviations; and converting slang and manufacturer-specific names to a consistent taxonomy for products of a class of the first and second products.

14. The product obsolescence forecast method of claim 12 wherein from the second product data element similarity matrix, the processor identifies multiple determinants of obsolescence, each of the multiple determinants applicable to all of the second products.

15. The product obsolescence forecast method of claim 12, wherein from the second product data element similarity matrix, the processor identifies multiple different determinants of obsolescence, one determinant for each of the second products.

16. The product obsolescence forecast method of claim 12 wherein from the second product data element similarity matrix, the processor identifies a singular primary determinant of obsolescence applicable to all of the second products.

17. The product obsolescence forecast method of claim 12, wherein the processor identities second products similar to the first product by:

extracting, formatting, and correcting first product data elements from one or more first product data records;

generating a combined first and second product similarity matrix comprising the second product data elements and the first product data elements; and identifying from the first and second product similarity matrix, second products having one or more second product data elements identical to a first product data element.

18. The product obsolescence forecast method of claim 12, wherein to generate the statistical analysis, the processor computes an average of the observations.

19. The product obsolescence forecast method of claim 16, wherein to identify the singular primary determinant of obsolescence applicable to all of the second products, the processor, for each of the extracted data elements for each of the second products:

applies each data element to the trained Bayesian neural network to generate an observation comprising a predicted obsolescence date for one of the second products;

based on the observation, determines an accuracy in predicting an actual obsolescence date for a second product;

ranks each of the extracted data elements of the second products in terms a prediction accuracy of each of the extracted data elements; and identifies the singular primary determinant based on the ranking, comprising selecting as the singular primary determinant, data element having a highest prediction accuracy.

* * * * *